US012785480B2

(12) United States Patent
Goykhman et al.

(10) Patent No.: US 12,785,480 B2
(45) Date of Patent: Nov. 3, 2026

(54) ELECTRIC MOTOR WITH INTEGRATED COOLING SYSTEM

(71) Applicant: EATON INTELLIGENT POWER LIMITED, Dublin (IE)

(72) Inventors: Mikhail Goykhman, Reseda, CA (US); Galen Chui, Ladera Ranch, CA (US); Armen Baronian, Toronto (CA)

(73) Assignee: Eaton Intelligent Power Limited, Dublin (IE)

( * ) Notice: Subject to any disclaimer, the term of this patent is extended or adjusted under 35 U.S.C. 154(b) by 299 days.

(21) Appl. No.: 17/801,131

(22) PCT Filed: Feb. 19, 2021

(86) PCT No.: PCT/EP2021/025066

§ 371 (c)(1),
(2) Date: Aug. 19, 2022

(87) PCT Pub. No.: WO2021/164945

PCT Pub. Date: Aug. 26, 2021

(65) Prior Publication Data

US 2023/0082277 A1 Mar. 16, 2023

Related U.S. Application Data

(60) Provisional application No. 62/979,849, filed on Feb. 21, 2020, provisional application No. 62/979,971, filed on Feb. 21, 2020.

(51) Int. Cl.

| | |
|---|---|
| ***H02K 3/24*** | (2006.01) |
| ***H02K 5/20*** | (2006.01) |
| ***H02K 9/197*** | (2006.01) |

(52) U.S. Cl.
CPC ............... *H02K 3/24* (2013.01); *H02K 5/203* (2021.01); *H02K 9/197* (2013.01)

(58) Field of Classification Search
CPC .......... H02K 9/197; H02K 5/203; H02K 3/24; H02K 1/20; B64D 27/24
See application file for complete search history.

(56) References Cited

U.S. PATENT DOCUMENTS 2,571,872 A 10/1951 Hayes
2,630,464 A 3/1953 Dunkelberger
(Continued)

FOREIGN PATENT DOCUMENTS

CN 1515060 7/2004
CN 205407546 U 7/2016
(Continued)

OTHER PUBLICATIONS

Shimizu (JP 2006014564 A) English Translation (Year: 2006).*
(Continued)

*Primary Examiner* — Tulsidas C Patel
*Assistant Examiner* — Robert E Mates
(74) *Attorney, Agent, or Firm* — Merchant & Gould, P.C.

(57) ABSTRACT

An axial flux electric can include a motor assembly including a motor shaft, a stator assembly, and a rotor assembly. The stator assembly can include a plurality of stator cores about which a wire coil is wound, wherein one or more of the stator cores includes a stator body with an internal fluid passageway for receiving a cooling fluid.

4 Claims, 22 Drawing Sheets

(56) References Cited

U.S. PATENT DOCUMENTS

| | | | | |
|---|---|---|---|---|
| 3,261,995 | A * | 7/1966 | Kohn | H02K 3/24 310/269 |
| 4,710,667 | A | 12/1987 | Whiteley | |
| 6,300,693 | B1 | 10/2001 | Poag et al. | |
| 6,661,133 | B2 | 12/2003 | Liebermann | |
| 6,768,932 | B2 | 7/2004 | Claypole et al. | |
| 7,675,209 | B2 | 3/2010 | Masoudipour et al. | |
| 7,928,348 | B2 | 4/2011 | Neal | |
| 8,022,593 | B2 | 9/2011 | Lamperth et al. | |
| 8,093,770 | B1 | 1/2012 | Berhan | |
| 8,183,723 | B2 | 5/2012 | Fee et al. | |
| 8,342,612 | B2 | 1/2013 | Sgherri et al. | |
| 8,508,085 | B2 | 8/2013 | Bradfield | |
| 8,629,585 | B2 | 1/2014 | Bradfield | |
| 8,803,380 | B2 | 8/2014 | Chamberlin et al. | |
| 8,922,093 | B2 | 12/2014 | Crocker | |
| 9,356,492 | B2 | 5/2016 | Chamberlin et al. | |
| 9,525,325 | B2 | 12/2016 | Chamberlin | |
| 9,641,051 | B2 | 5/2017 | Kalev | |
| 9,917,486 | B2 | 3/2018 | Kirkley, Jr. et al. | |
| 10,044,237 | B2 | 8/2018 | Woolmer et al. | |
| 10,075,030 | B2 | 9/2018 | Klassen | |
| 10,224,786 | B2 | 3/2019 | Woolmer et al. | |
| 10,468,923 | B2 | 11/2019 | Heilman et al. | |
| 2002/0130566 | A1 | 9/2002 | Greubel | |
| 2007/0013241 | A1 | 1/2007 | Schiferl et al. | |
| 2007/0176499 | A1 | 8/2007 | Holmes | |
| 2008/0093850 | A1 | 4/2008 | Taneja et al. | |
| 2011/0309694 | A1* | 12/2011 | Woolmer | H02K 21/24 310/44 |
| 2012/0132473 | A1 | 5/2012 | Weber et al. | |
| 2012/0161554 | A1 | 6/2012 | Ghelardi et al. | |
| 2013/0049495 | A1 | 2/2013 | Matsuo | |
| 2013/0187492 | A1 | 7/2013 | Woolmer | |
| 2014/0009025 | A1 | 1/2014 | Hosek et al. | |
| 2014/0015351 | A1 | 1/2014 | Marvin et al. | |
| 2014/0091650 | A1 | 4/2014 | Lenschow | |
| 2014/0292117 | A1* | 10/2014 | Lee | H02K 5/203 310/54 |
| 2014/0300220 | A1 | 10/2014 | Marvin | |
| 2014/0354089 | A1 | 12/2014 | Chamberlin et al. | |
| 2014/0354090 | A1 | 12/2014 | Chamberlin | |
| 2015/0030479 | A1 | 1/2015 | Müller | |
| 2016/0164377 | A1 | 6/2016 | Gauthier et al. | |
| 2016/0226327 | A1* | 8/2016 | Rippel | H02K 9/197 |
| 2016/0329765 | A1 | 11/2016 | Pal et al. | |
| 2016/0329796 | A1 | 11/2016 | Hano et al. | |
| 2017/0012480 | A1 | 1/2017 | Woolmer | |
| 2017/0025927 | A1 | 1/2017 | Weerts et al. | |
| 2017/0063182 | A1 | 3/2017 | Heilman et al. | |
| 2018/0054094 | A1 | 2/2018 | Dlala et al. | |
| 2018/0305036 | A1 | 10/2018 | Vondrell et al. | |
| 2019/0181717 | A1 | 6/2019 | Zhou et al. | |
| 2019/0288584 | A1 | 9/2019 | Vansompel et al. | |
| 2019/0379257 | A1 | 12/2019 | Gerstler et al. | |
| 2019/0383292 | A1 | 12/2019 | Kreidler et al. | |
| 2020/0003215 | A1* | 1/2020 | Geue | H02K 3/30 |
| 2022/0393527 | A1 | 12/2022 | Goykhman et al. | |
| 2022/0393543 | A1 | 12/2022 | Goykhman et al. | |
| 2022/0399791 | A1 | 12/2022 | Goykhman et al. | |
| 2022/0416613 | A1 | 12/2022 | Goykhman et al. | |
| 2023/0038386 | A1 | 2/2023 | Goykhman et al. | |

FOREIGN PATENT DOCUMENTS

| | | | | |
|---|---|---|---|---|
| CN | 106059121 | | | 10/2016 |
| CN | 106464088 | | | 2/2017 |
| CN | 206759275 | U | | 12/2017 |
| CN | 107612252 | | | 1/2018 |
| CN | 109474114 | A | | 3/2019 |
| CN | 109478808 | A | | 3/2019 |
| CN | 109742904 | | | 5/2019 |
| CN | 112602254 | | | 4/2021 |
| DE | 101 40 362 | A1 | | 3/2003 |
| DE | 10 2014 221 648 | A1 | | 4/2016 |
| EP | 1 045 505 | A2 | | 10/2000 |
| EP | 2 109 208 | A1 | | 10/2009 |
| EP | 2 224 577 | A1 | | 9/2010 |
| EP | 3 028 888 | A1 | | 6/2016 |
| EP | 3 079 239 | A1 | | 10/2016 |
| EP | 3 460 958 | A1 | | 3/2019 |
| EP | 3 338 345 | B1 | | 6/2019 |
| GB | 974730 | A | | 11/1964 |
| GB | 2 538 526 | A | | 11/2016 |
| HU | 0103035 | | | 5/2002 |
| JP | S59126554 | | | 8/1984 |
| JP | 2004-208461 | A | | 7/2004 |
| JP | 2006014564 | A | * | 1/2006 |
| JP | 2006-033965 | A | | 2/2006 |
| JP | 2006050752 | A | * | 2/2006 |
| JP | 4026496 | | | 12/2007 |
| JP | 2009-050066 | A | | 3/2009 |
| JP | 2013-121226 | A | | 6/2013 |
| KR | 2005/0007326 | | | 1/2005 |
| WO | 2009/025076 | A1 | | 2/2009 |
| WO | 2010/092403 | A2 | | 8/2010 |
| WO | 2018/015293 | A1 | | 1/2018 |
| WO | 2019/171318 | A1 | | 9/2019 |
| WO | 2021/089188 | A1 | | 5/2021 |
| WO | 2021/089189 | A1 | | 5/2021 |
| WO | 2021/115632 | A1 | | 6/2021 |

OTHER PUBLICATIONS

Goto (JP 2006050752 A) English Translation (Year: 2006).*

International Search Report and Written Opinion of the International Searching Authority for International Patent Application No. PCT/EP2020/025497 mailed Feb. 8, 2021, 17 pages.

International Search Report and Written Opinion of the International Searching Authority for International Patent Application No. PCT/EP2020/025498 mailed Feb. 8, 2021, 15 pages.

International Search Report and Written Opinion of the International Searching Authority for International Patent Application No. PCT/EP2020/025500 mailed Feb. 10, 2021, 12 pages.

International Search Report and Written Opinion of the International Searching Authority for International Patent Application No. PCT/EP2020/025570 mailed Apr. 9, 2021, 12 pages.

International Search Report and Written Opinion of the International Searching Authority for International Patent Application No. PCT/EP2021/025064 mailed May 20, 2021, 14 pages.

International Search Report and Written Opinion of the International Searching Authority for International Patent Application No. PCT/EP2021/025065 mailed May 27, 2021, 14 pages.

International Search Report and Written Opinion of the International Searching Authority for International Patent Application No. PCT/EP2021/025067 mailed May 28, 2021, 13 pages.

International Search Report and Written Opinion of the International Searching Authority for International Patent Application No. PCT/EP2021/025066 mailed May 27, 2021, 12 pages.

European Office Action for EP Patent Application No. 20808296.6 dated Jul. 2, 2025, 5 pages.

Chinese Search Report dated Apr. 20, 2026 for Chinese Patent Application No. 2021800205086, 3 pages (No English Translation).

Chinese Office Action for Chinese Patent Application No. 202180020508.6 dated Sep. 27, 2025, 15 pages.

* cited by examiner

ELECTRIC MOTOR WITH INTEGRATED COOLING SYSTEM

CROSS-REFERENCE TO RELATED APPLICATIONS

This application is a National Stage Application of PCT/EP2021/025066, filed on Feb. 19, 2021, which claims the benefit of U.S. Patent Application Ser. No. 62/979,971, filed on Feb. 21, 2020, and claims the benefit of U.S. Patent Application Ser. No. 62/979,849, filed on Feb. 21, 2020, the disclosures of which are incorporated herein by reference in their entireties. To the extent appropriate, a claim of priority is made to each of the above-disclosed applications.

TECHNICAL FIELD

The present disclosure relates generally to electric motors and systems and methods for cooling electric motors.

BACKGROUND

More-electric aircraft and all-electric aircraft are increasingly becoming more relevant in the aerospace industry. Electrical drive systems (EDS) including an electric motor and an electric drive are gaining interest in aerospace applications due to growing demands for more/all-electric aircrafts. To enhance the design of these new air vehicles, power density of electric machines is becoming an important factor due to the weight/volume constraints associated with air travel. Achieving higher current to weight and current to volume target is a real challenge. One of the hurdles to deal with in a high power density machine is heat extraction.

FIG. 1 shows an example thermal management arrangement for a prior system 50 including an electric motor 52 coupled in series to a separate gear train 54 and a propeller 56 or other load source using a motor shaft. An electric drive 58 controls the speed and/or torque applied by the electric motor 52 to the motor shaft based on a voltage and/or current input of the electric drive 58. The electric motor 52 is thermally managed using a separate coolant pump 60 and a separate heat exchanger 62. The coolant pump 60 drives coolant from the coolant pump 60, to the electric drive 58 to absorb heat from the electric drive 58, to the electric motor 52 to absorb heat from the electric motor 52, and to a heat exchanger 62 to dissipate the absorbed heat.

The coolant driven by the pump 60 passes through external piping that connects the various components. In some examples, the coolant proceeds along a cyclic piping pathway 64 from the pump 60, to the electric drive 58, to the electric motor 52, and then to the heat exchanger 62. In other examples, the coolant proceeds along separate piping pathways between the pump 60 and the various components 58, 52, 62. The external piping needs to be fitted to each of the components for connection to internal coolant pathways (e.g., channels) within the component. Further, sufficient coolant must be provided to span the distance between the components as well as to circulate within the components.

Improvements are desired.

SUMMARY

An axial flux electric motor can include a motor assembly including a motor shaft, a rotor assembly, and a stator assembly including a plurality of stator cores about which a wire coil is wound, wherein one or more of the stator cores includes a stator body with an internal fluid passageway for receiving a cooling fluid.

In some examples, the stator body internal fluid passageway includes a plurality of fluid passageways.

In some examples, the internal fluid passageway extends to a fluid inlet and a fluid outlet located at an outer surface of the stator body.

In some examples, the outer surface of the stator body is an end surface of the stator body.

In some examples, the internal fluid passageway extends to a fluid inlet located at an outer surface of the stator body.

In some examples, the internal fluid passageway extends to a plurality of outlet ports located on one or more sides of the stator body.

In some examples, the motor assembly further includes a pump for delivering cooling fluid to the internal fluid passageway.

In some examples, the motor assembly further includes a sump for collecting cooling fluid discharged from the plurality of outlet ports.

A stator assembly can include a plurality of stator cores about which a wire coil is wound, wherein one or more of the stator cores includes a stator body with an internal fluid passageway for receiving a cooling fluid.

In some examples, the stator body internal fluid passageway includes a plurality of fluid passageways.

In some examples, the internal fluid passageway extends to a fluid inlet and a fluid outlet located at an outer surface of the stator body.

In some examples, the outer surface of the stator body is an end surface of the stator body.

In some examples, the internal fluid passageway extends to a fluid inlet located at an outer surface of the stator body.

In some examples, the internal fluid passageway extends to a plurality of outlet ports located on one or more sides of the stator body.

In some examples, the motor assembly further includes a pump for delivering cooling fluid to the internal fluid passageway.

In some examples, the motor assembly further includes a sump for collecting cooling fluid discharged from the plurality of outlet ports.

A method of cooling a stator assembly of a motor can include delivering a cooling fluid to a plurality of stator cores about which a wire coil is wound and directing the cooling fluid through internal passageways of the stator cores.

In some examples, cooling fluid is discharged from the internal passageways onto the wire coil.

In some examples, the delivering step is performed with a pump.

In some examples, the delivering step is performed with a pump driven by the motor.

A motor assembly can include a motor shaft, a rotor assembly, a stator assembly including at least one stator core about which a wire coil is wound, and an intermediate cooling layer disposed between the at least one stator core and the wire coil, wherein the intermediate cooling layer includes a stator body with an internal fluid passageway for receiving a cooling fluid.

In some examples, the internal fluid passageway includes a plurality of fluid passageways.

In some examples, the internal fluid passageway extends to a fluid inlet and a fluid outlet located at an outer surface of the intermediate cooling layer.

In some examples, the intermediate cooling layer includes extensions extending between individual windings of the wire coil.

In some examples, the internal fluid passageway extends to a fluid inlet located at an outer surface of the intermediate cooling layer.

In some examples, the internal fluid passageway extends to a plurality of outlet ports located on one or more sides of intermediate cooling layer.

In some examples, the motor assembly further includes a pump for delivering cooling fluid to the internal fluid passageway.

In some examples, the intermediate cooling layer is formed from a thermally conductive material.

A stator assembly for a motor can include at least one stator core about which a wire coil is wound and an intermediate cooling layer disposed between the at least one stator core and the wire coil, wherein the intermediate cooling layer includes a stator body with an internal fluid passageway for receiving a cooling fluid.

In some examples, the internal fluid passageway includes a plurality of fluid passageways.

In some examples, the internal fluid passageway extends to a fluid inlet and a fluid outlet located at an outer surface of the intermediate cooling layer.

In some examples, the intermediate cooling layer includes extensions extending between individual windings of the wire coil.

In some examples, wherein the internal fluid passageway extends to a fluid inlet located at an outer surface of the intermediate cooling layer.

In some examples, wherein the internal fluid passageway extends to a plurality of outlet ports located on one or more sides of intermediate cooling layer.

In some examples, the motor assembly further includes a pump for delivering cooling fluid to the internal fluid passageway.

In some examples, the intermediate cooling layer is formed from a thermally conductive material.

A method for cooling a motor can include delivering a cooling fluid to at least one stator core about which a wire coil is wound and directing the cooling fluid through internal passageways of an intermediate cooling layer disposed between the at least one stator core and the wire coil.

In some examples, the method further includes directing the cooling fluid through a plurality of intermediate cooling layers associated with a plurality of stator cores.

In some examples, the delivering step is performed with a pump.

In some examples, the delivering step is performed with a pump driven by the motor.

A motor assembly can include a motor shaft, a rotor assembly, a stator assembly including at least one stator core about which a wire coil is wound and embedded within a thermally conductive material, the stator assembly defining an annulus with a radial interior side and a radial exterior side, and a first internal fluid passageway defined within the thermally conductive material and being located at one of the radial interior side and the radial exterior side of the stator assembly, the first internal fluid passageway being configured for receiving a cooling fluid.

In some examples, the first internal fluid passageway includes a plurality of internal fluid passageways.

In some examples, the first internal fluid passageway is located at the radial interior side of the stator assembly.

In some examples, the first internal fluid passageway is located at the radial exterior side of the stator assembly.

In some examples, the motor further includes a second internal fluid passageway defined within the thermally conductive material and being located at the other of the radial interior side or the radial exterior side of the stator assembly, the second internal fluid passageway being configured for receiving the cooling fluid.

In some examples, the first and second internal fluid passageways each include a plurality of internal fluid passageways.

In some examples, the first internal fluid passageway is located at the radial interior side of the stator assembly and the second internal fluid passageway is located at the radial exterior side of the stator assembly.

In some examples, the first internal fluid passageway and the second internal fluid passageway each include at least one fluid inlet and at least one fluid outlet.

In some examples, the motor assembly further includes a pump for delivering cooling fluid to the first internal fluid passageway.

In some examples, the thermally conductive material is an epoxy material.

A stator assembly for a motor can include at least one stator core about which a wire coil is wound and a stator assembly including at least one stator core about which a wire coil is wound and embedded within a thermally conductive material, the stator assembly defining an annulus with a radial interior side and a radial exterior side, and a first internal fluid passageway defined within the thermally conductive material and being located at one of the radial interior side and the radial exterior side of the stator assembly, the first internal fluid passageway being configured for receiving a cooling fluid.

In some examples, the first internal fluid passageway includes a plurality of internal fluid passageways.

In some examples, the first internal fluid passageway is located at the radial interior side of the stator assembly.

In some examples, the first internal fluid passageway is located at the radial exterior side of the stator assembly.

In some examples, the stator assembly includes a second internal fluid passageway defined within the thermally conductive material and being located at the other of the radial interior side or the radial exterior side of the stator assembly, the second internal fluid passageway being configured for receiving the cooling fluid.

In some examples, the first and second internal fluid passageways each include a plurality of internal fluid passageways.

In some examples, the first internal fluid passageway is located at the radial interior side of the stator assembly and the second internal fluid passageway is located at the radial exterior side of the stator assembly.

In some examples, the first internal fluid passageway and the second internal fluid passageway each include at least one fluid inlet and at least one fluid outlet.

In some examples, the thermally conductive material is an epoxy material.

A method of cooling a stator assembly of a motor can include delivering a cooling fluid to at least one stator core about which a wire coil is wound and directing the cooling fluid through one or more internal passageways of a thermally conductive material within which the wire coil is embedded.

In some examples, the delivering step is performed with a pump.

In some examples, the delivering step is performed with a pump driven by the motor.

An electric motor assembly can include a motor shaft, a stator assembly, and a rotor assembly and a cooling jacket surrounding the stator assembly, the cooling jacket including an inner wall facing radially inwardly towards the stator assembly and an opposite outer wall facing radially outwardly, a circumferential first internal fluid passageway for allowing a cooling fluid to be pumped through an interior of the cooling jacket, the internal fluid passageway being disposed between the inner and outer walls and extending between an inlet and an outlet, and a first end plate covering and in contact with at least a portion of a first end if the stator assembly, the first end plate including a second internal fluid passageway in fluid communication with the first circumferential fluid pathway for allowing the cooling fluid to be pumped through an interior of the first end plate.

In some examples, the end plate is located between the stator assembly and magnets associated with the motor assembly.

In some examples, the second internal fluid passageway includes a plurality of internal passageways.

In some examples, the end plate is in direct contact with an end face of one or more stator cores associated with the stator assembly.

In some examples, the end plate second internal passageway is in fluid communication with the circumferential first internal passageway at a plurality of connection points.

In some examples, the end plate and the cooling jacket are formed from the same type of material.

In some examples, the end plate and the cooling jacket are formed from different types of materials.

In some examples, the electric motor assembly includes an axial flux electric motor assembly.

In some examples, the electric motor assembly further includes a pump for delivering cooling fluid to the internal fluid passageway.

In some examples, the pump is driven by the motor shaft.

A cooling system for an electric motor assembly can include a cooling jacket for surrounding a stator assembly, the cooling jacket including an inner wall facing radially inwardly and an opposite outer wall facing radially outwardly, a circumferential first internal fluid passageway for allowing a cooling fluid to be pumped through an interior of the cooling jacket, the internal fluid passageway being disposed between the inner and outer walls and extending between an inlet and an outlet, and a first end plate configured to cover and be in contact with at least a portion of the stator assembly, the first end plate including a second internal fluid passageway in fluid communication with the first circumferential fluid pathway for allowing the cooling fluid to be pumped through an interior of the first end plate.

In some examples, the second internal fluid passageway includes a plurality of internal passageways.

In some examples, the end plate second internal passageway is in fluid communication with the circumferential first internal passageway at a plurality of connection points.

In some examples, the end plate and the cooling jacket are formed from the same type of material.

In some examples, the end plate and the cooling jacket are formed from different types of materials.

A method of cooling a stator assembly of a motor can include the steps of delivering and returning a cooling fluid to a cooling jacket surrounding the stator assembly and delivering and returning the cooling fluid to an end plate in direct contact with an end face of the stator assembly such that that cooling is provided to the stator assembly at least at two sides of the stator assembly.

In some examples, the delivering steps include directing the cooling fluid from internal passageways of the cooling jacket to and from internal passageways of the end plate.

In some examples, the delivering steps are performed with a pump.

In some examples, the delivering step is performed with a pump driven by the motor.

In some examples, the cooling fluid is one of oil, glycol, and water.

An electric motor assembly unit can include an electric motor extending along a longitudinal axis between a first axial end and a second axial end, the electric motor including a stator assembly, a rotor assembly that rotates relative to the stator assembly, and a motor shaft that operationally coupled to the rotor assembly, the motor shaft extending along the longitudinal axis of the electric motor beyond the first axial end; and a heat exchanger mounted to the electric motor so as to be disposed between the first and second axial ends of the electric motor and structurally supported by the electric motor, the heat exchanger including an exchanger housing and a coolant pathway routed within the exchanger housing, the exchanger housing extending radially outwardly from the electric motor.

In some examples, the heat exchanger encircles the stator assembly about the longitudinal axis of the electric motor.

In some examples, the heat exchanger extends only a portion of a circumference of the stator assembly.

In some examples, the coolant pathway within the heat exchanger is a first coolant pathway, and wherein the first coolant pathway is fluidly coupled to a second coolant pathway within the electric motor.

In some examples, the second coolant pathway includes channels extending through a cooling jacket that surrounds the rotor assembly and stator assembly.

In some examples, the second coolant pathway includes channels extending through portions of the stator cores of the stator assembly.

In some examples, the second coolant pathway extends to a coolant pump mounted to the electric motor.

In some examples, the coolant pump is mounted to the motor shaft.

In some examples, the coolant pump is at least partially recessed into a motor housing that covers the rotor assembly.

In some examples, the electric motor assembly further includes an epicyclic gear train disposed within the electric motor so that the epicyclic gear train is enclosed within the stator assembly and rotor assembly, wherein the epicyclic gear train includes a sun gear, a carrier coupled to a plurality of planet gears that mesh with the sun gear, and an outer ring having inwardly-facing teeth that mesh with the planet gears, wherein at least one of the sun gear, the carrier, and the outer ring rotates in unison with the drive shaft.

In some examples, the electric motor assembly further includes a third coolant pathway providing coolant to the epicyclic gear train, the third coolant pathway being fluidly coupled to the coolant pathway extending through the exchanger housing.

In some examples, a coolant pump mounted to the electric motor, the coolant pump being coupled to a first gear stage of the epicyclic gear train that rotates at a different speed from the drive shaft.

In some examples, the coolant pump is mounted to the drive shaft.

In some examples, an electric drive is disposed at an outer surface of the stator assembly.

In some examples, the coolant pathway is fluidly coupled to a respective coolant pathway for the electric drive.

In some examples, the electric motor includes an axial flux electric motor.

An aircraft propulsion system can include a propeller operationally coupled to a drive shaft extending along a longitudinal axis; an electric motor including a rotor assembly that rotates relative to a stator assembly to rotate the drive shaft; a heat exchanger mounted to the electric motor so that the heat exchanger extends radially outwardly from the electric motor, the heat exchanger extending along the longitudinal axis between opposite first and second axial ends; and a flow path along which air flow generated by the propeller flows to the first axial end of the heat exchanger.

In some examples, the electric motor is one of a plurality of electric motors applying torque to the drive shaft, each of the electric motors being aligned along the longitudinal axis and being operationally coupled to the drive shaft; and wherein the heat exchanger is one of a plurality of heat exchangers, each of the heat exchangers being mounted to a respective one of the electric motors.

In some examples, each of the heat exchangers extends radially outwardly from a circumferential section of the respective electric motor, wherein the heat exchangers are circumferentially staggered so that a respective first axial end of each of the heat exchangers is accessible to the flow path.

In some examples, a nacelle surrounding a portion of the drive shaft is provided, the nacelle being spaced from the propeller along the longitudinal axis of the drive shaft, the electric motor and the heat exchanger being located within the nacelle, wherein the flow path includes a first flow path extending into the nacelle and a second flow path extending around the nacelle, the first flow path extending to the first axial end of the heat exchanger.

In some examples, the heat exchanger and the electric motor share a coolant pathway.

In some examples, an epicyclic gear train is disposed within the electric motor, the electric motor sharing a coolant pathway with the epicyclic gear train.

An electric motor assembly unit can include an electric motor extending along a longitudinal axis between a first axial end and a second axial end, the electric motor including a stator assembly, a rotor assembly that rotates relative to the stator assembly, a motor shaft operationally coupled to the rotor assembly, and a motor housing surrounding the rotor assembly and the stator assembly, the motor shaft extending along the longitudinal axis of the electric motor beyond the first and second axial ends; and an epicyclic gear train disposed within the motor housing of the electric motor between the first and second axial ends of the electric motor, the epicyclic gear train includes a sun gear, a carrier coupled to a plurality of planet gears that mesh with the sun gear, and an outer ring having inwardly-facing teeth that mesh with the planet gears, each of the sun gear, the carrier, and the outer ring forming a respective gear stage of the epicyclic gear train, wherein the gear stage of at least one of the sun gear, the carrier, and the outer ring rotates in unison with the drive shaft; and a coolant pump mounted to the electric motor, the coolant pump being coupled to another of the gear stages of the epicyclic gear train that rotates at a different speed from the drive shaft.

In some examples, a coolant pathway extending from the coolant pump, through the electric motor, to the epicyclic gear train is provided, wherein the coolant pathway is contained at least substantially within the motor housing of the electric motor.

In some examples, the coolant pump is disposed external of the motor housing at the first axial end of the electric motor.

In some examples, the motor housing includes a heat exchanger and a coolant pump integrated therewith.

A variety of additional aspects will be set forth in the description that follows. The aspects relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure.

DETAILED DESCRIPTION

Figure 1:
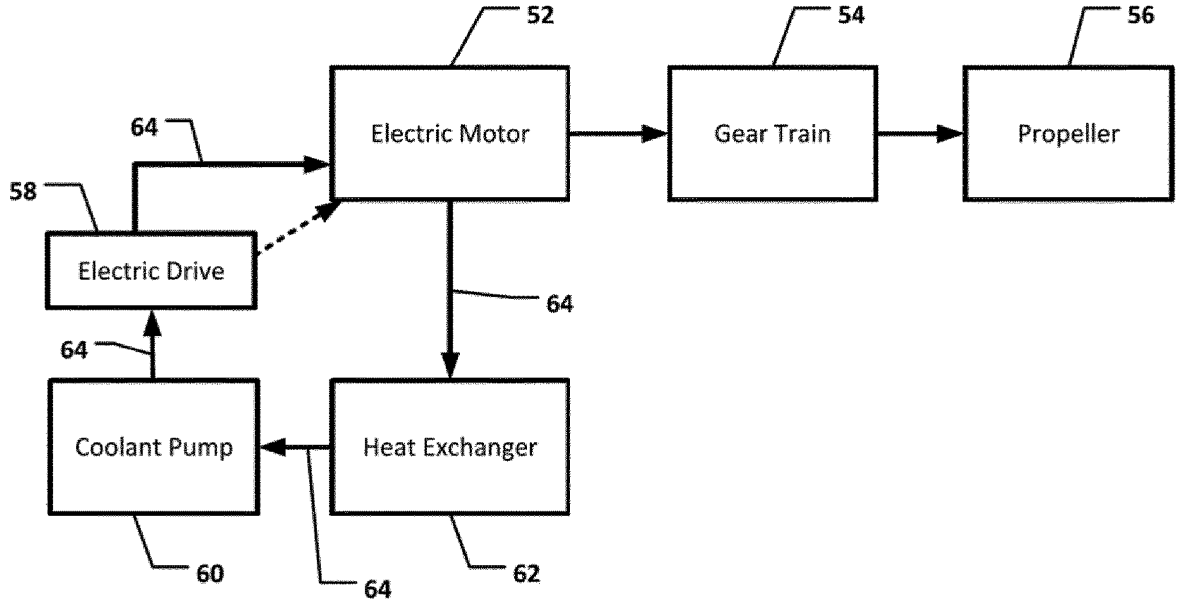
FIG. 1 (Prior Art)
FIG. 1 is a schematic diagram of an example prior art system for providing thermal management to an electric motor.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. Referring to the drawings wherein like reference numbers correspond to like or similar components throughout the several Figures.

General Motor Description

Reference will now be made in detail to exemplary aspects of the present disclosure that are illustrated in the accompanying drawings. Wherever possible, the same reference numbers will be used throughout the drawings to refer to the same or like parts.

The present disclosure is directed to an electric motor assembly unit 100 including an electric motor 110 having one or more integrated thermal management components. The electric motor assembly unit 100 extends along a longitudinal axis L between opposite first and second axial ends 102, 104. In the example shown, the electric motor assembly unit 100 has a generally circular cross-sectional area that varies in diameter along the longitudinal axis L. In other examples, however, the electric motor assembly unit 100 can have other cross-sectional shapes (e.g., rectangular, oblong, etc.). In some implementations, the electric motor 110 is an axial flux motor 110. In other implementations, the electric motor 110 is a radial flux motor.

Figure 2:
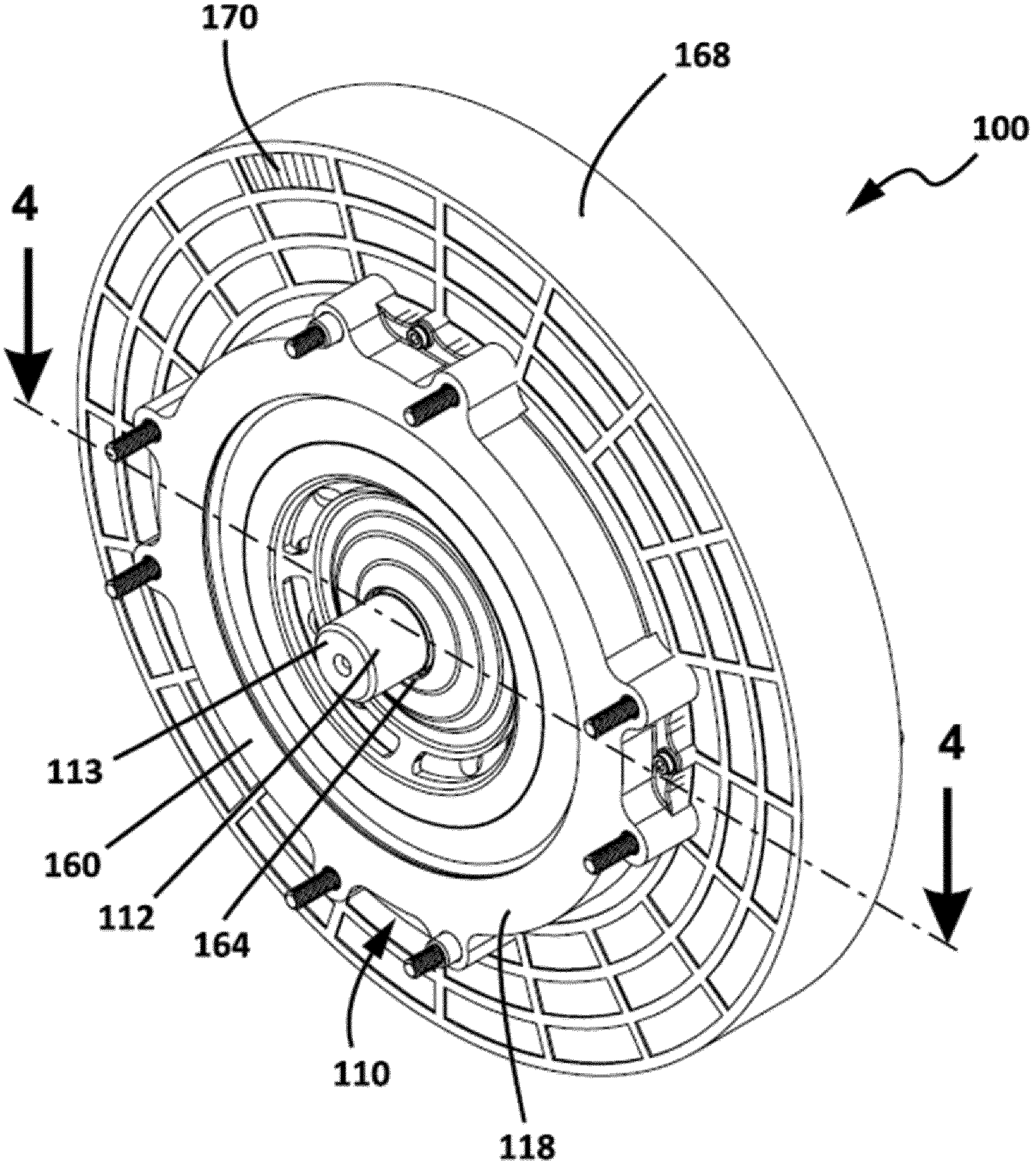
FIG. 2 is a perspective view of an example electric motor assembly unit including an electric motor and a heat exchanger configured in accordance with the principles of the present disclosure.
Figure 3:
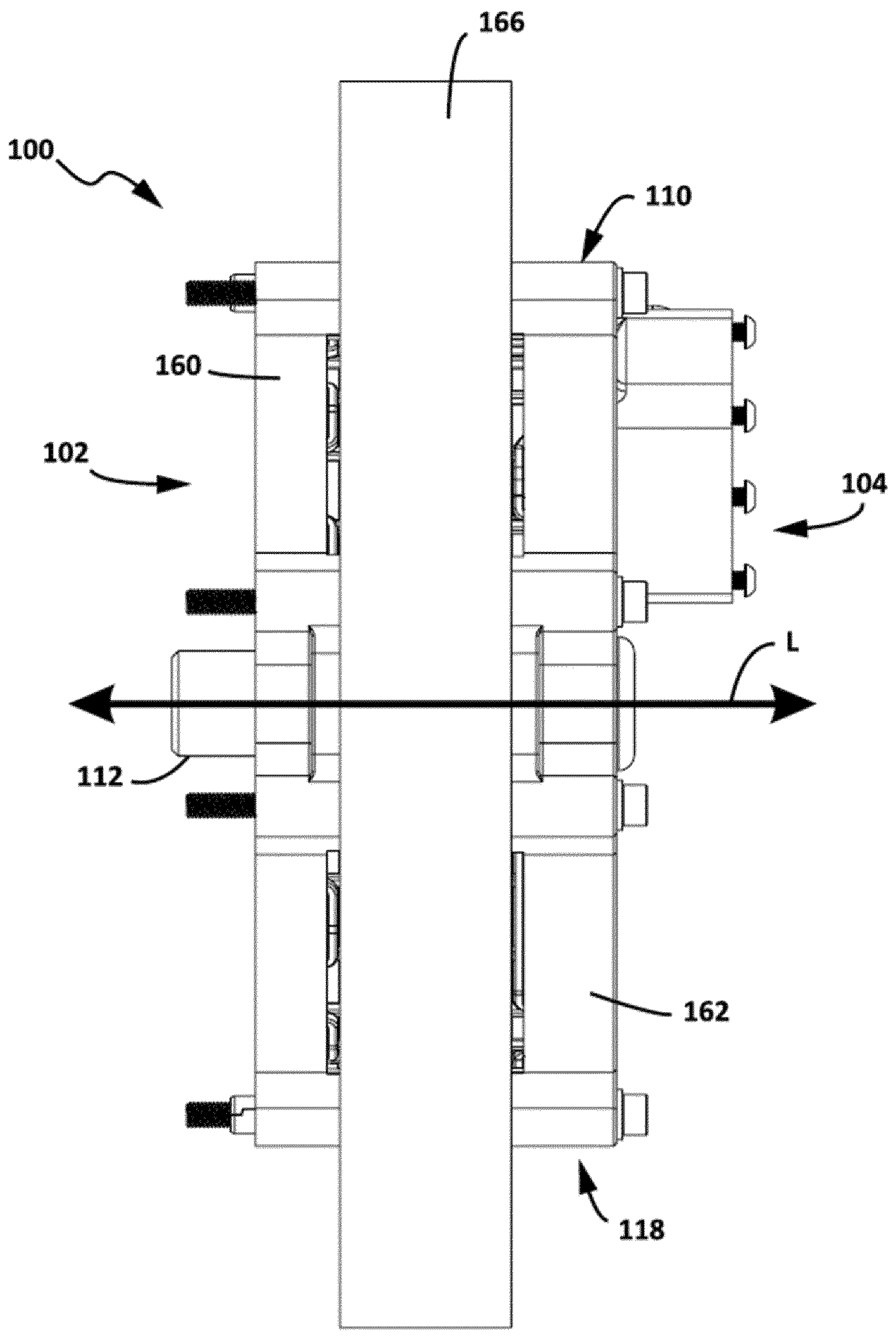
FIG. 3 is a side elevational view of the electric motor assembly unit of FIG. 2.
Figure 4:
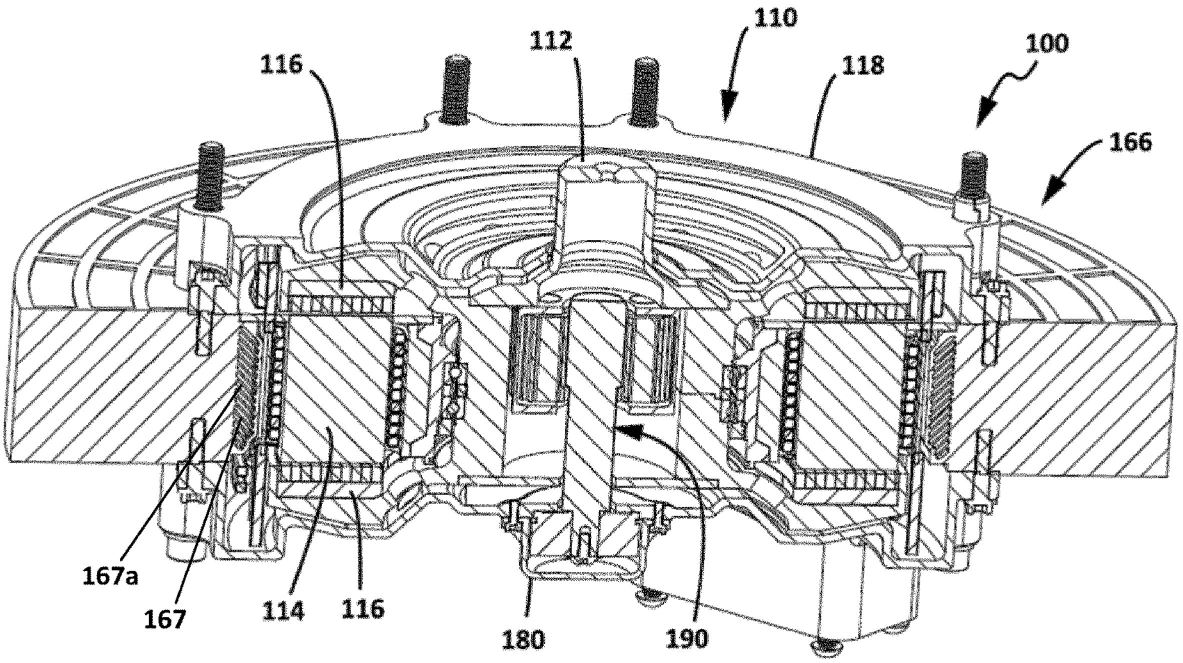
FIG. 4 is a perspective view of an example cross-section of the electrical motor assembly unit taken along the 4-4 line of FIG. 2.

As shown in FIGS. 2-4, the electric motor 110 includes a motor shaft 112, a stator assembly 114, and a rotor assembly 116. The motor shaft 112 extends along the longitudinal axis L of the electric motor assembly unit 100. The rotor assembly 116 is adapted to rotate about the longitudinal axis L relative to the stator assembly 114. The motor shaft 112 is operationally coupled to the rotor assembly 116 to also rotate about the longitudinal axis L while the rotor assembly 116 is rotating. In some implementations, the motor shaft 112 rotates in unison with the rotor assembly 116. In other implementations, the motor shaft 112 rotates at a different gear stage from the rotor assembly 116. In certain implementations, a motor housing 118 encloses the stator assembly 114 and the rotor assembly 116. An end portion 113 of the motor shaft 112 projects outwardly from the motor housing 118 along the axis of rotation L.

Figure 5:
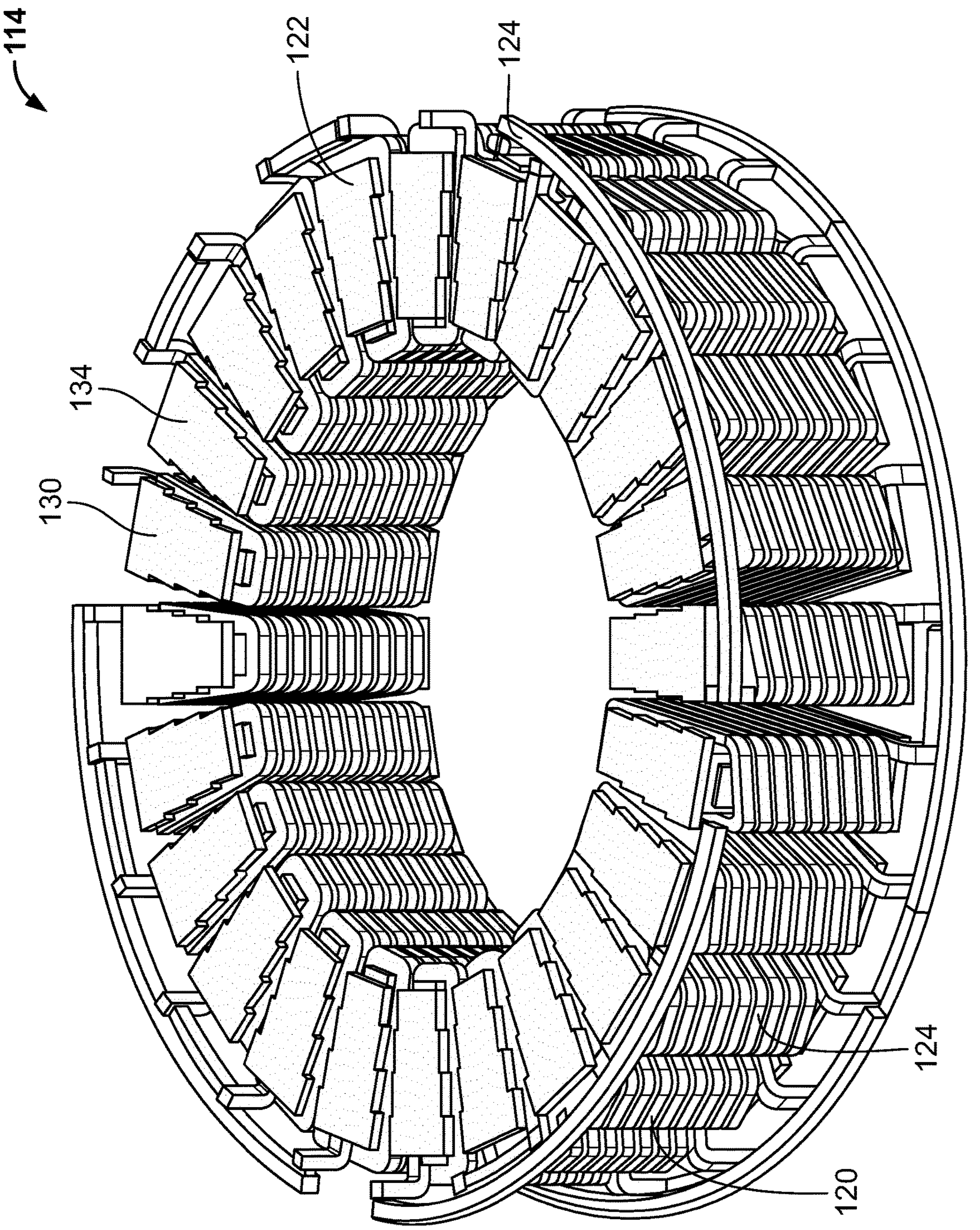
FIG. 5 is a perspective view of an example stator assembly suitable for use with the electric motor of FIG. 2.
Figure 6:
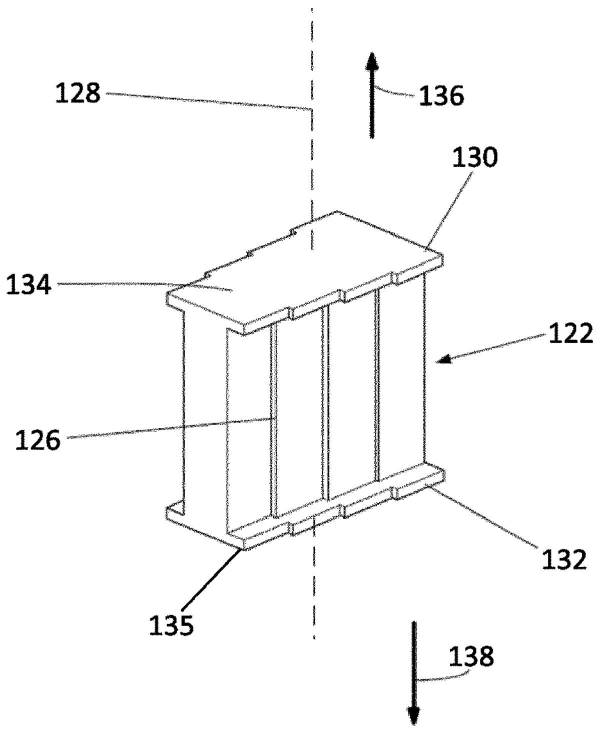
FIG. 6 is a perspective view of an example stator core suitable for use with the stator assembly of FIG. 5.
Figure 7:
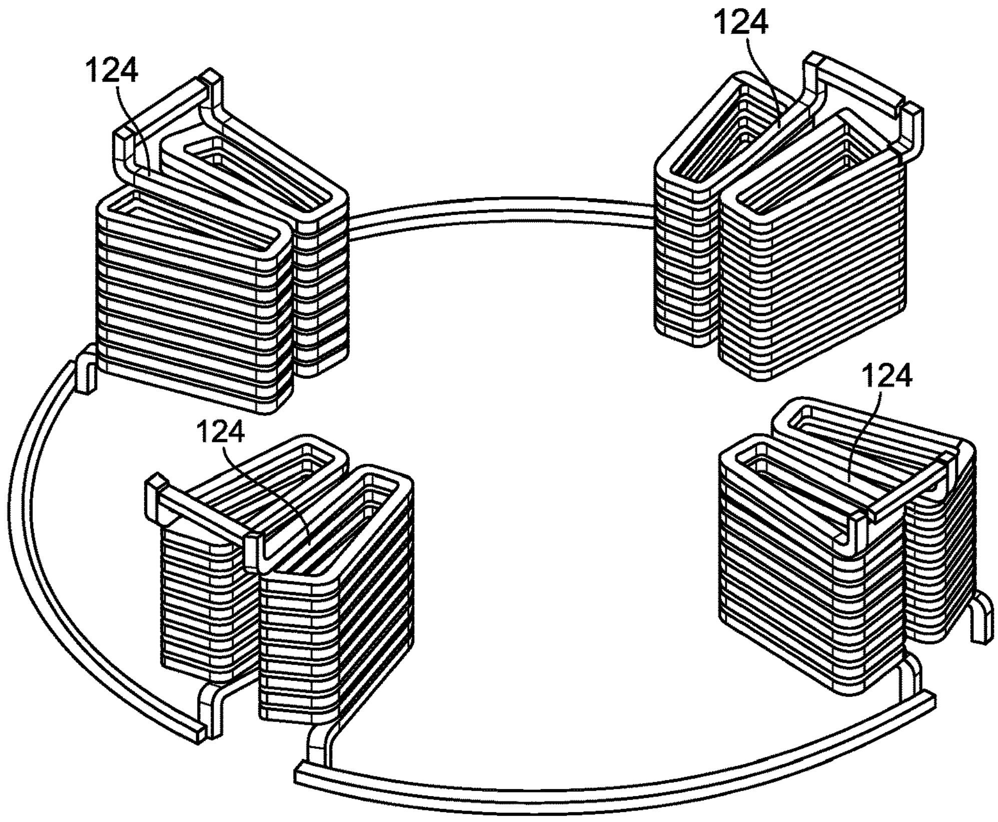
FIG. 7 is a perspective view of an example wire coiling suitable for use with the stator assembly of FIG. 5.

FIGS. 5-7 illustrate an example stator assembly 114 suitable for use with the electric motor 100 described herein. The stator assembly 114 includes multiple electromagnets 120 spaced circumferentially about the axis of rotation L. The electromagnets 120 each include a stator core 122 about which a wire coil 124 is wound (e.g., a copper winding as shown at FIG. 7). FIG. 6 shows a stator core 122. The stator cores 122 each include a core body 126 which extends along a core axis 128 between first and second opposite axial ends 130, 132 of the core body 126. The first axial ends 130 define first end faces 134 that face in a first axial direction 136 and the second axial ends 132 define second end faces 135 that face in a second axial direction 138 opposite from the first axial direction 136. The wire coils 124 are wound about the core axes 128 and are located between the first and second axial ends 136, 138 of the core bodies 126. The first and second axial ends 130, 132 of each stator core 122 are adapted to define opposite magnetic poles of each corresponding electromagnet 120.

Figure 8:
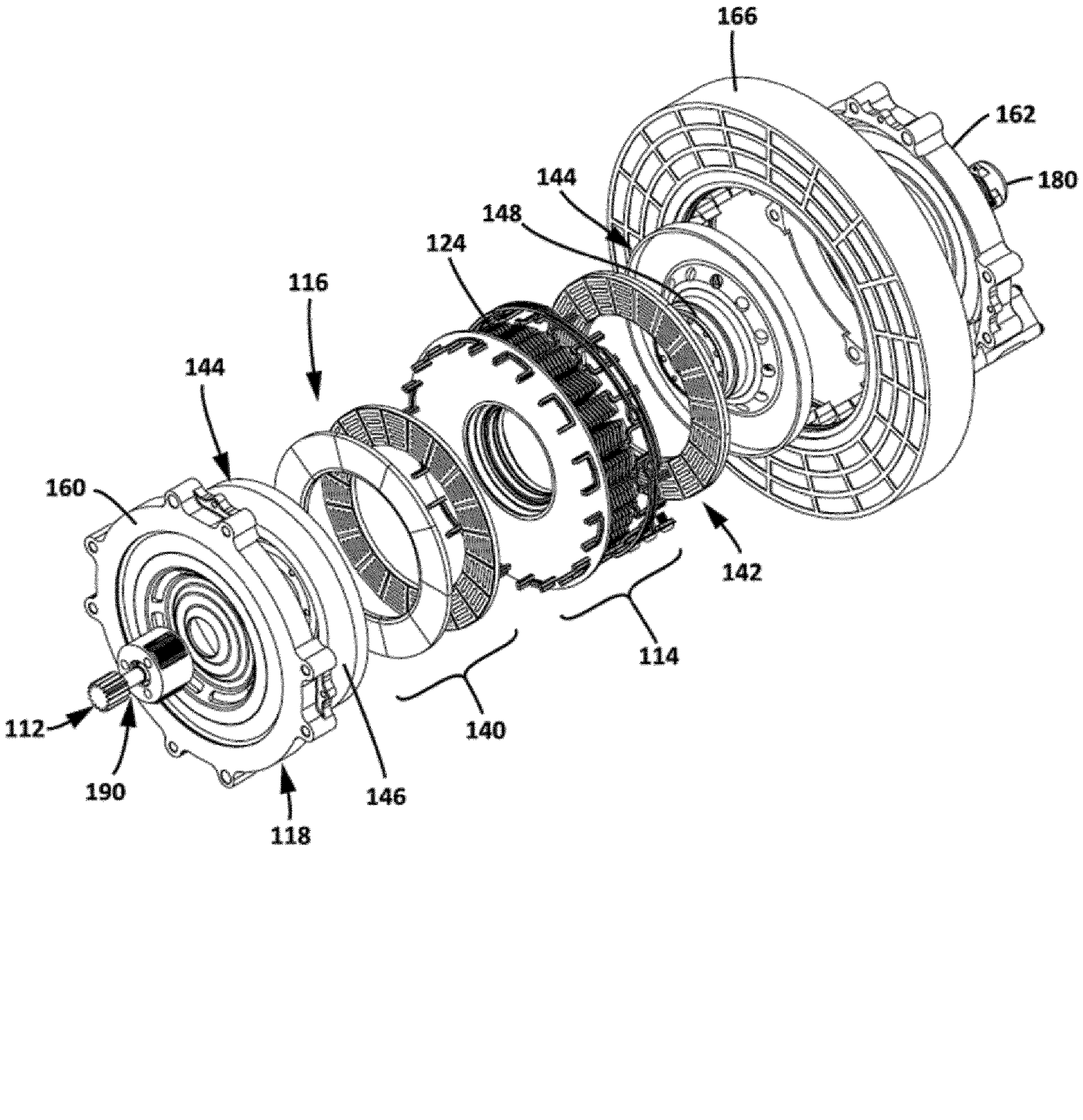
FIG. 8 is a perspective view of an example electric motor assembly unit that is substantially the same as the electric motor assembly unit of FIG. 2 except the motor shaft is defined by a gear train that fits within the electric motor.
Figure 9:
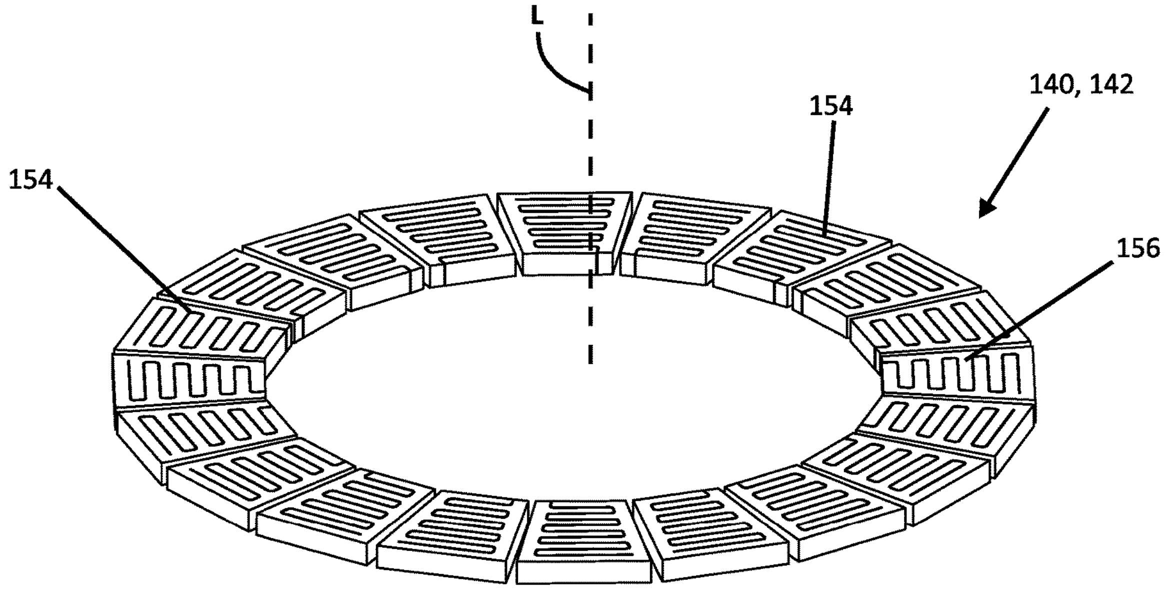
FIG. 9 is a perspective view of an example magnetic rotor suitable for use with the rotor assembly of the electric motor of FIG. 2.

An example rotor assembly 116 suitable for use with the electric motor 100 described herein is shown in FIGS. 8-9. The rotor assembly 116 includes a first magnetic rotor 140 and a second magnetic rotor 142 disposed at opposite axial ends of the stator assembly 114. The first and second magnetic rotors 140, 142 are adapted to rotate in unison with each other about the axis of rotation L. In certain implementations, the first and second magnetic rotors 140, 142 are identical to each other.

Each of the magnetic rotors 140, 142 is supported by a respective rotor carrier 144 including a rotor plate 146 (e.g., a rotor flange) that projects radially outwardly from a central hub portion 148. The central hub portions 148 of the first and second magnetic rotors 140, 142 are preferably fastened (e.g., bolted) together to define a hub of the rotor assembly 116. The hub can be mounted for rotation relative to the stator cores 122 by one or more rotational bearings 150. As depicted, the rotational bearings 150 can be mounted between the hub and a sleeve 152 secured at an inner diameter of the stator assembly 114. In one example, the electromagnets 120 can be secured about the sleeve 152 by an adhesive material such as a thermally conductive epoxy.

In some implementations, the motor shaft 112 is coupled to the rotor assembly 116. For example, the motor shaft 112 can include a flange 113 that is fastened (e.g., bolted) to the hub 148 of the rotor assembly 116. In such implementations, it will be appreciated that the motor shaft 112 and the rotor assembly 116 are adapted to rotate in unison with respect to one another about the axis of rotation L relative to the stator assembly 114. In other implementations, a gear train (e.g., an epicyclic gear train as will be described in more detail herein) operationally couples the motor shaft 112 to the hub 148 so that the motor shaft 112 rotates at a different speed and/or torque from the hub 148.

Figure 10:
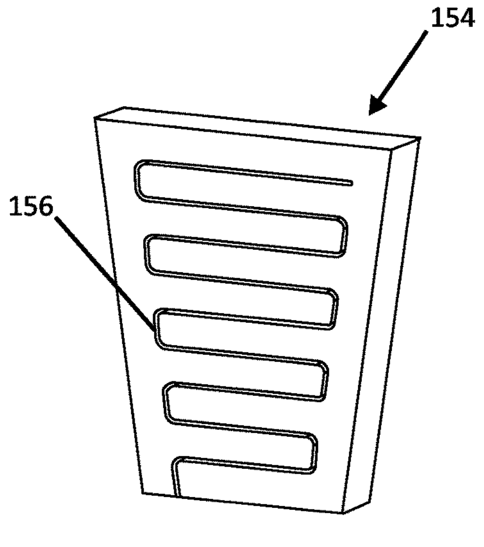
FIG. 10 is a perspective view of an example permanent magnet of the magnetic rotor of FIG. 9.

FIG. 9 illustrate an example implementation of a magnetic rotor suitable for use as the first magnetic rotor 140 and/or the second magnetic rotor 142. The magnetic rotor 140, 142 includes multiple permanent magnets 154 (e.g., see FIG. 10) carried by the rotor plate 148 of the respective carrier 144. The permanent magnets 154 are circumferentially spaced about the axis of rotation L. The permanent magnets 154 of the first magnetic rotor 140 have first permanent magnet end faces 156 positioned to oppose the first axial end faces 134 of the stator cores 122. The permanent magnet end faces 156 are spaced from the first axial end faces 134 of the stator cores 122 by a first air gap. The permanent magnets 154 of the second magnetic rotor 142 have second permanent magnet end faces positioned to oppose the second axial end faces of the stator cores 122. The second permanent magnet end faces are spaced from the second axial end faces of the stator cores 122 by a second air gap.

Referring back to FIGS. 2-4, the motor housing 118 encloses the stator and rotor assemblies 114, 116 to form an exterior of the motor assembly unit 100. The motor housing 118 includes first and second axial walls 160, 162 that cover the carriers 144 of the first and second magnetic rotors 140, 142, respectively. In certain examples, the first and second axial walls 160, 162 preferable have a metal (e.g., aluminum) construction. The first axial end wall 160 defines a central opening 164 through which the end portion 113 of the motor shaft 112 extends. The motor housing 118 also includes a circumferential wall that extends between the first and second axial walls 160, 162. In one example, the second axial end wall 162 can be unitarily connected with the circumferential wall, while the first axial end wall 160 can be configured as a removable axial end cover.

In certain examples, the heat exchanger 166 shares structural supports with the electric motor 110, thereby reducing the overall weight of the electric motor assembly unit 100. For example, the heat exchanger 166 may be structurally supported by the electric motor 110 (e.g., by the stator assembly 114 and/or by the circumferential wall of the motor housing 118). In certain examples, the heat exchanger 166 forms the circumferential wall of the motor housing 118, thereby reducing the number of parts in the system to be manufactured and assembled and reducing overall weight of the system.

Figure 12:
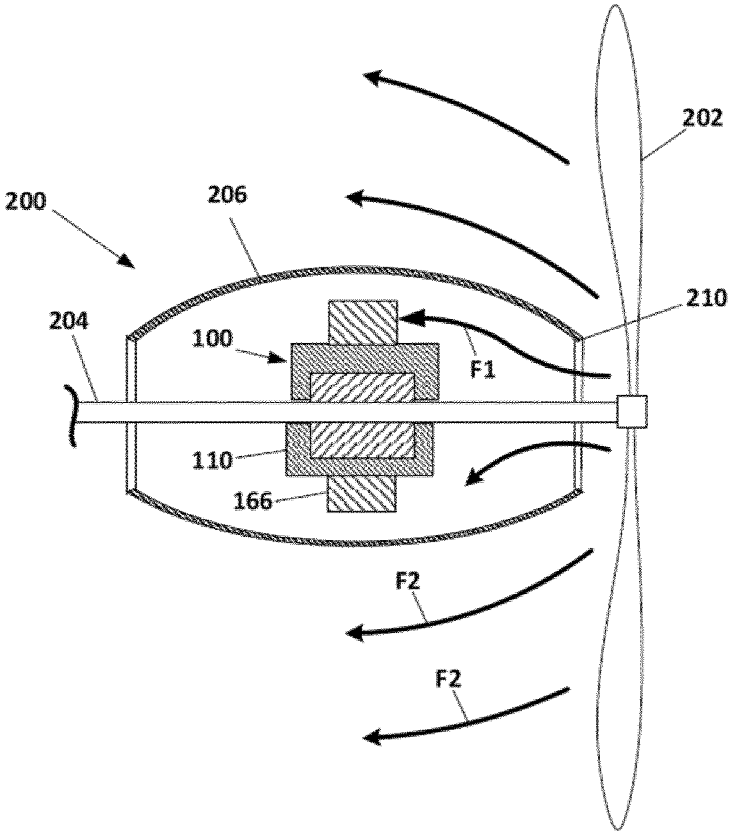
FIG. 12 is a schematic diagram of the electric motor assembly unit of FIG. 2 disposed within a nacelle of an example aircraft propulsion system and configured in accordance with the principles of the present disclosure.
Figure 13:
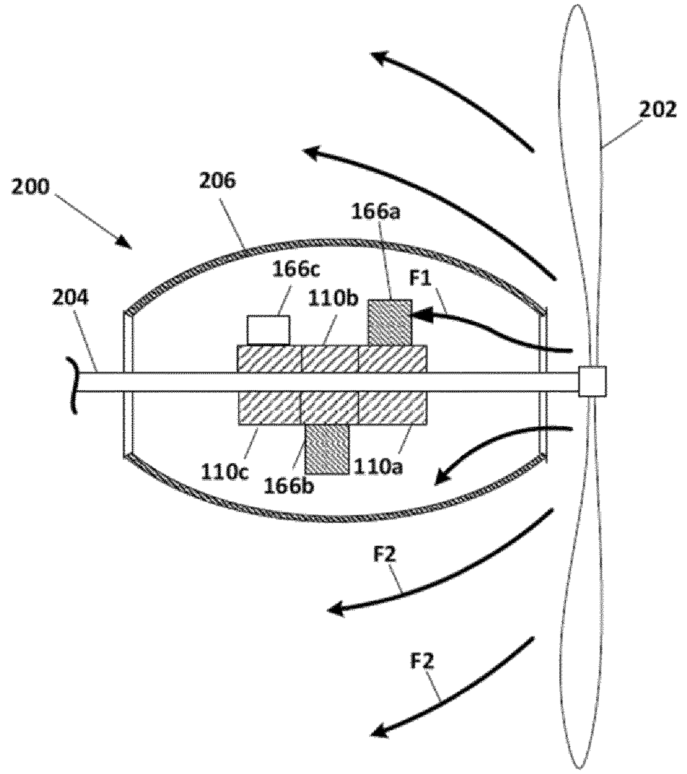
FIG. 13 shows multiple electric motors disposed within the nacelle of FIG. 12, each electric motor having a respective heat exchanger that is circumferentially staggered relative to the other heat exchangers.
Figure 14:
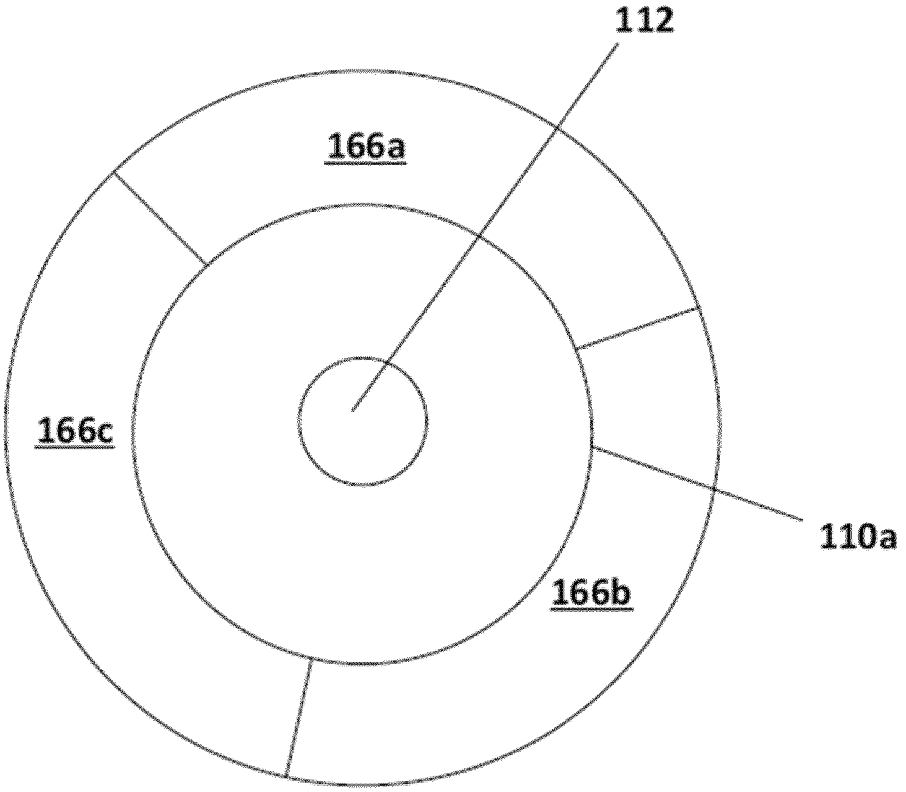
FIG. 14 is a partial view of a cross-section of the drive shaft of FIG. 13 taken along the 14-14 line.

FIGS. 12-14 illustrates one example environment (e.g., an aircraft propulsion system 200) in which the electric motor assembly unit 100 can be utilized. The propulsion system 200 includes a propeller 202 or other propulsor operationally coupled to a drive shaft 204 driven by the electric motor assembly unit 100. In certain implementations, the electric motor assembly unit 100 is disposed within an interior 208 of a nacelle 206 or other body disposed about the drive shaft 204. When the propeller 202 spins, the propeller 202 generates air flow that produces thrust for the aircraft.

In the example shown, a first portion F1 of the air flow produced by the propeller 202 enters an open end 210 of the nacelle 206 and flows towards the electric motor assembly unit 100. The electric motor assembly unit 100 is disposed within the nacelle 206 in line with the first portion F1 of the air flow. Accordingly, the first portion F1 of the air flow aids the heat exchanger 166 in dissipating heat by flowing through the heat exchanger 166 and carrying the heat away from a coolant pathway 172, discussed in more detail below. A second portion F2 of the air flow produced by the propeller 202 flows around the nacelle 206. In certain examples, the first portion F1 is substantially smaller than the second portion F2.

As shown in FIGS. 13 and 14, multiple electric motors 110 may cooperate to apply torque to the drive shaft 204. Each electric motor 110 may have a respective heat exchanger 166. In certain implementations, the heat exchangers 166 may be arranged to allow the first portion F1 of the air flow to reach each of the heat exchangers 166 (e.g., arranged so that none of the heat exchangers 166 blocks any of the other heat exchangers 166). As shown in FIG. 13, a first electric motor 110*a* is disposed in line with a second electric motor 110*b* and a third electric motor 110*c*. Each of the electric motors 110*a*-110*c* has a respective heat exchangers 166*a*-166*c* that extends along only part of a circumference of the electric motor 110*a*-110*c*. As shown in FIG. 14, the heat exchangers 166*a*, 166*b*, 166*c* can be circumferentially staggered so that an axial end face of each heat exchanger 166*a*, 166*b*, 166*c* is accessible to the first air flow F1.

Figure 15:
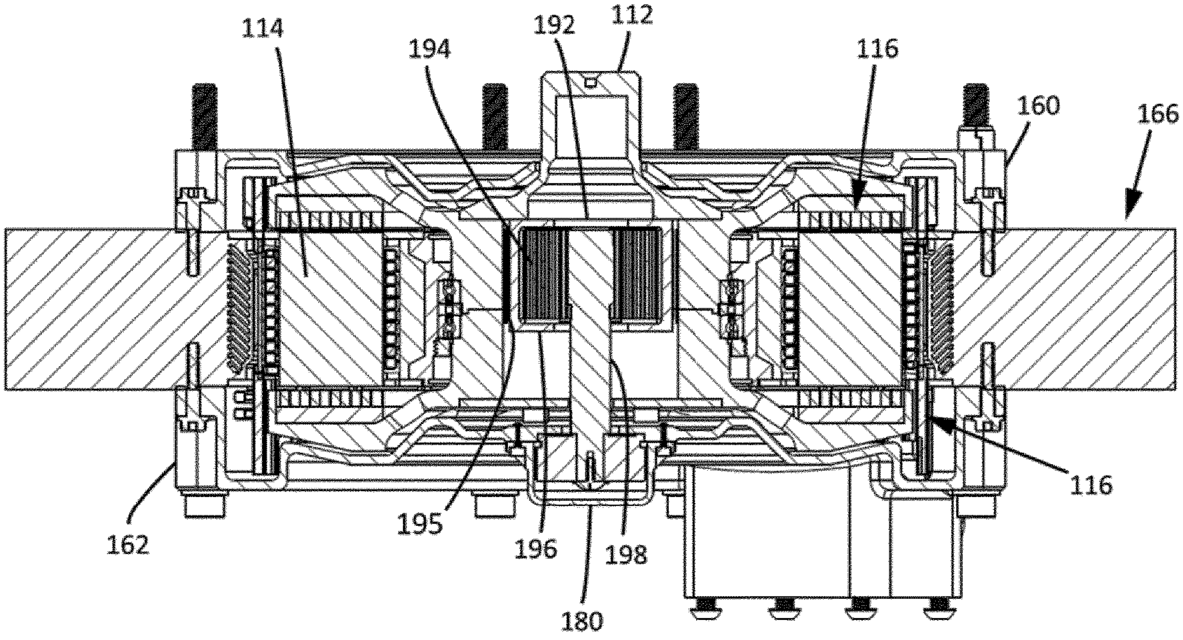
FIG. 15 is a cross-sectional view of the electrical motor assembly unit of FIG. 2 taken along the 4-4 line.
Figure 16:
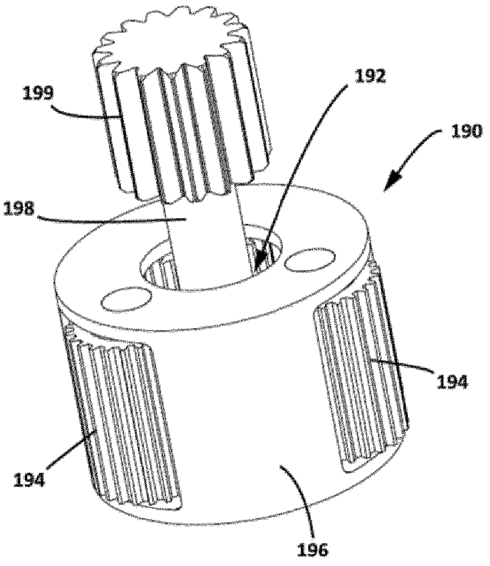
FIG. 16 is a perspective view of part of an epicyclic gear train suitable for use with the electric motor assembly unit of FIG. 2.
Figure 18:
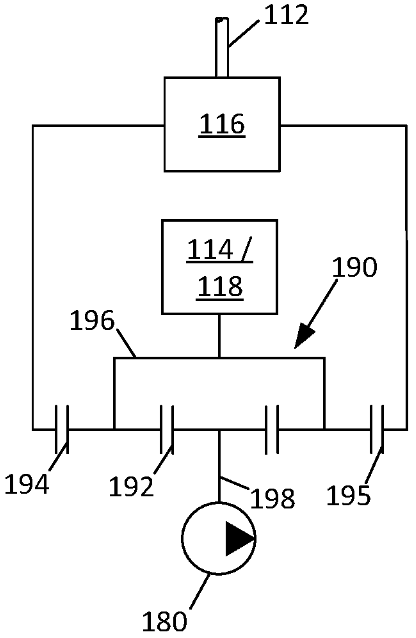
FIG. 18 is a schematic diagram of the epicyclic gear train and related components of the electric motor assembly unit of FIG. 2.

Referring to FIGS. 15, 16, and 18, the coolant pump 180 can be integrated into the electric motor assembly unit 100. For example, the coolant pump 180 can be mounted directly to the electric motor 100 (e.g., to the motor shaft 112). In some implementations, the coolant pump 180 can be operated by rotation of the motor shaft 112. In such implementations, the coolant pump 180 drives the coolant based on the speed at which the rotor assembly 116 is rotating relative to the stator assembly 114. In other implementations, however, the coolant pump 180 can be operationally coupled to the rotor assembly 116 via a gear train to change the torque and/or speed applied to the coolant pump 180.

In certain implementations, the coolant pump 180 can be operationally coupled to the rotor assembly 116 via an epicyclic gear train 190. The epicyclic gear train 190 includes a sun gear 192 that meshes with a plurality (e.g., three) planetary gears 194 that surround the sun gear 192. The planetary gears 194 mesh with inner teeth 195 of a surrounding ring. In the example shown, the inner teeth 195 are disposed on the interior face of a sleeve or hub area defined by the rotor assembly 116 within which the epicyclic gear train 190 is disposed. In certain implementations, the planetary gears 194 are held in position around the sun gear 192 by a gear housing 196 relative to which the planetary gears 194 rotate. The gear housing 196, which functions as a carrier for the planetary gears 194, may be rotationally fixed relative to the stator assembly 114 and/or to the motor housing 118.

In certain implementations, the epicyclic gear train 190 is disposed within the electric motor 110. For example, the epicyclic gear train 190 may be disposed inside of the rotor assembly 116. In certain examples, the central hub portion 148 of the magnetic rotors 140, 142 may include inner teeth to form the surrounding ring of the epicyclic gear train 190. Accordingly, the sun gear 192 spins at a different speed and/or with a different torque from the rotor assembly 116. If the motor shaft 112 is directly coupled to the rotor assembly 116, then the sun gear 192 spins at a different speed and/or with a different torque from the motor shaft 112.

In certain implementations, the sun gear 192 may include a shaft 198 that extends outwardly from the sun gear 192 along an axis of rotation of the sun gear 192. In an example, the axis of rotation of the sun gear 192 is the longitudinal axis L of the electric motor assembly unit 100. In certain examples, the shaft 198 couples to the coolant pump 180 (e.g., see FIG. 15). For example, the coolant pump 198 may be coupled to the sun gear 192 to optimize the rotational speed of the pump for efficiency and weight. In such examples, a motor shaft 112 that is coupled to rotate in unison with the rotor assembly 116 extends from an opposite side of the electric motor 110 from the coolant pump 180 (e.g., see FIG. 4).

Figure 11:
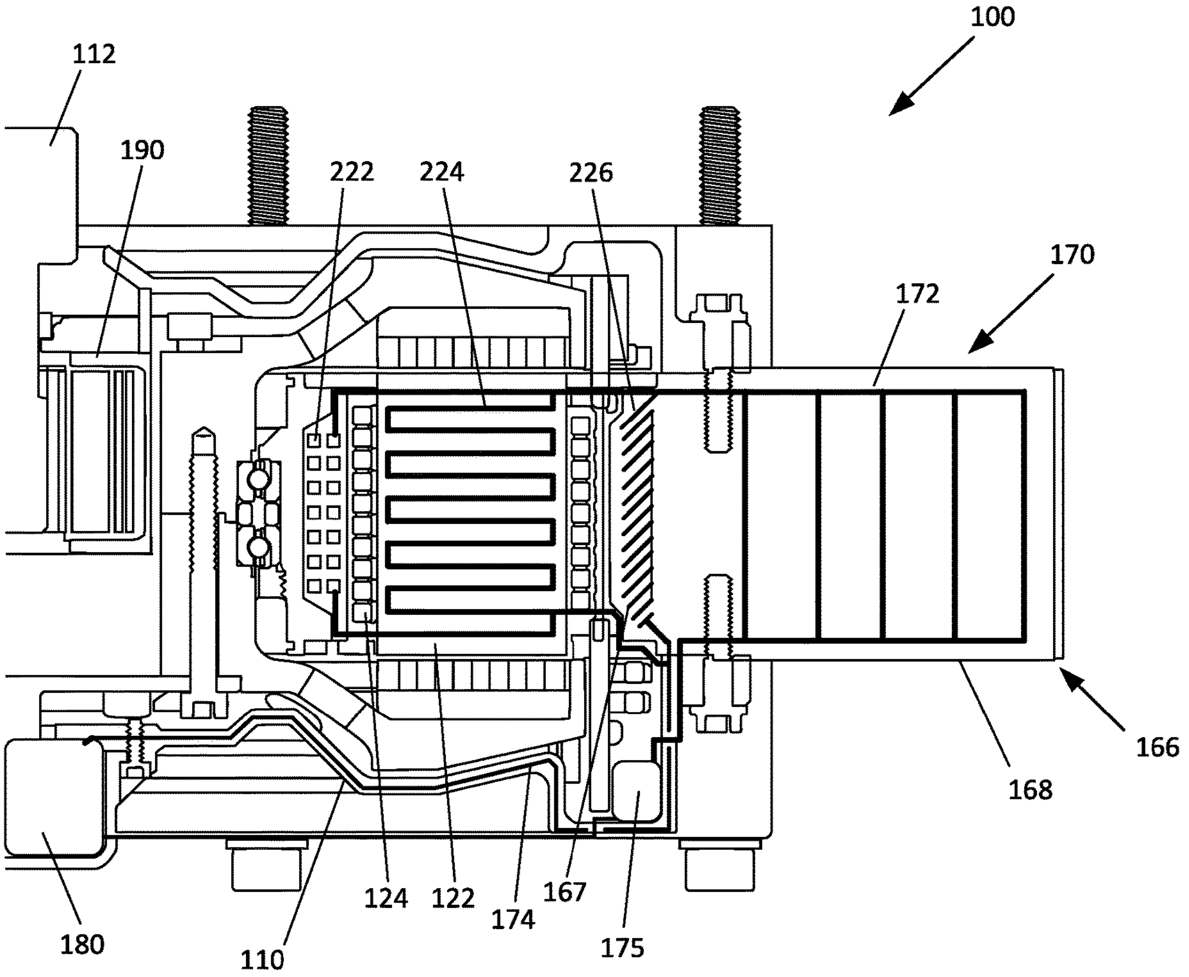
FIG. 11 is a partial view of a cross-section taken of the electric motor assembly unit where example coolant pathways are overlaid.
Figure 19:
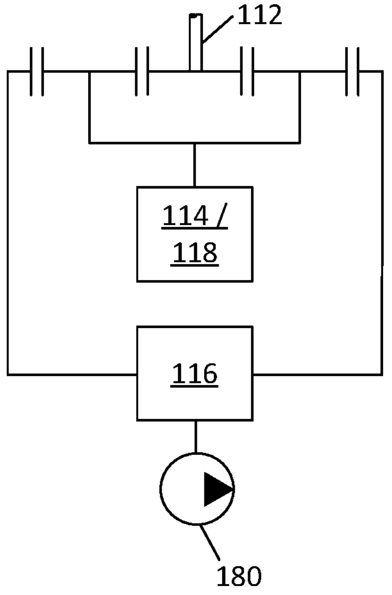
FIG. 19 is a schematic diagram of an alternative arrangement of the epicyclic gear train and related components of the electric motor assembly unit of FIG. 2.

In other implementations, the coolant pump 180 may be coupled to rotate in unison with a carrier turned by the planetary gears 194. In certain examples, the coolant pump 180 may be embedded within the motor shaft 112. In such examples, the motor shaft 112 may be defined by the shaft 198 of the sun gear 192 (e.g., see FIG. 8). In other implementations, the coolant pump 180 may be coupled to rotate in unison with the rotor assembly 116, as is shown at FIGS. 11 and 19. With such a configuration, the epicyclic gear train 190 may be used to interconnect the rotor assembly 116 with the motor shaft 112 such that the output speed/torque of the motor shaft 112 is different than the output speed/torque of the rotor assembly 116 as also shown at FIGS. 11 and 19.

Figure 17:
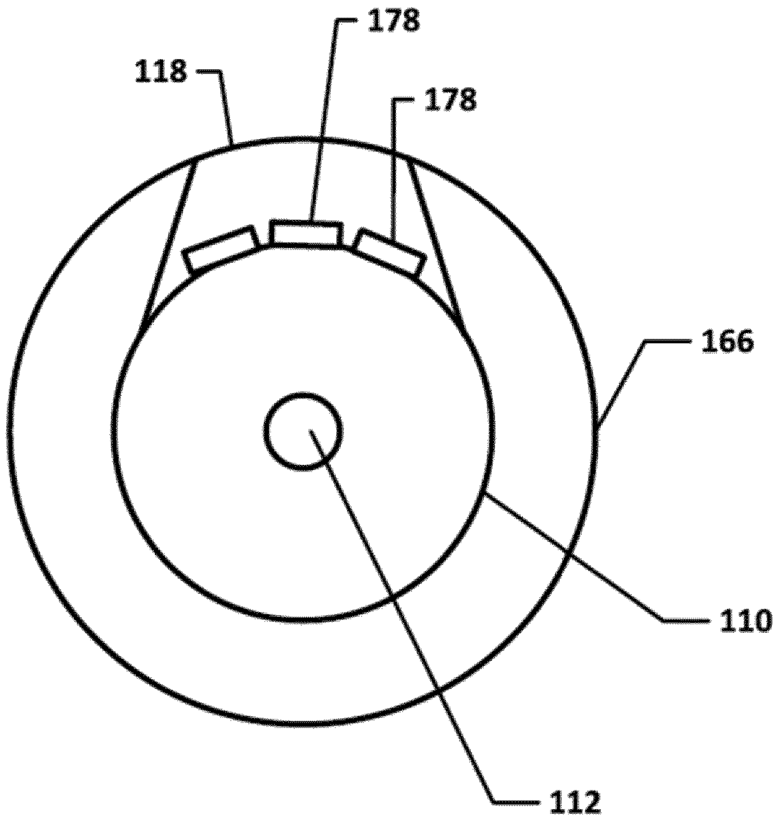
FIG. 17 is a schematic diagram of an example end view of another electric motor assembly unit configured in accordance with the principles of the present disclosure.

In certain implementations, an electric drive 178 for the electric motor 110 can be integrated with the electric motor assembly unit 100. In such implementations, the electric drive 178 may share thermal management with the electrical motor 110. In some examples, the electric drive 178 may be disposed towards an inner circumferential surface of the heat exchanger 166. Coolant routed to the heat exchanger 166 may pass by the electric drive to collect heat. In other examples, the electric drive 178 may be mounted to a cooling jacket that extends over part of a circumference of the electric motor 110 (e.g., see FIG. 17). The heat exchanger 166 may extend over a remainder of the circumference of the electric motor 110. In certain examples, the motor housing 118 may include a cover that extends over the electric drive 178 between circumferential edges of the heat exchanger 166.

Examples of how the electric drive 178 can be suitable mounted to an exterior of the electric motor 110 are shown and described in U.S. Provisional Application No. 62/946,172, filed Dec. 10, 2019, and titled "Cooling Jacket Integrated with Cold Plate," and in PCT Application Serial Number PCT/EP2020/025570 filed on Dec. 10, 2020, the disclosures of which are hereby incorporated herein by reference in its entirety.

Figure 20:
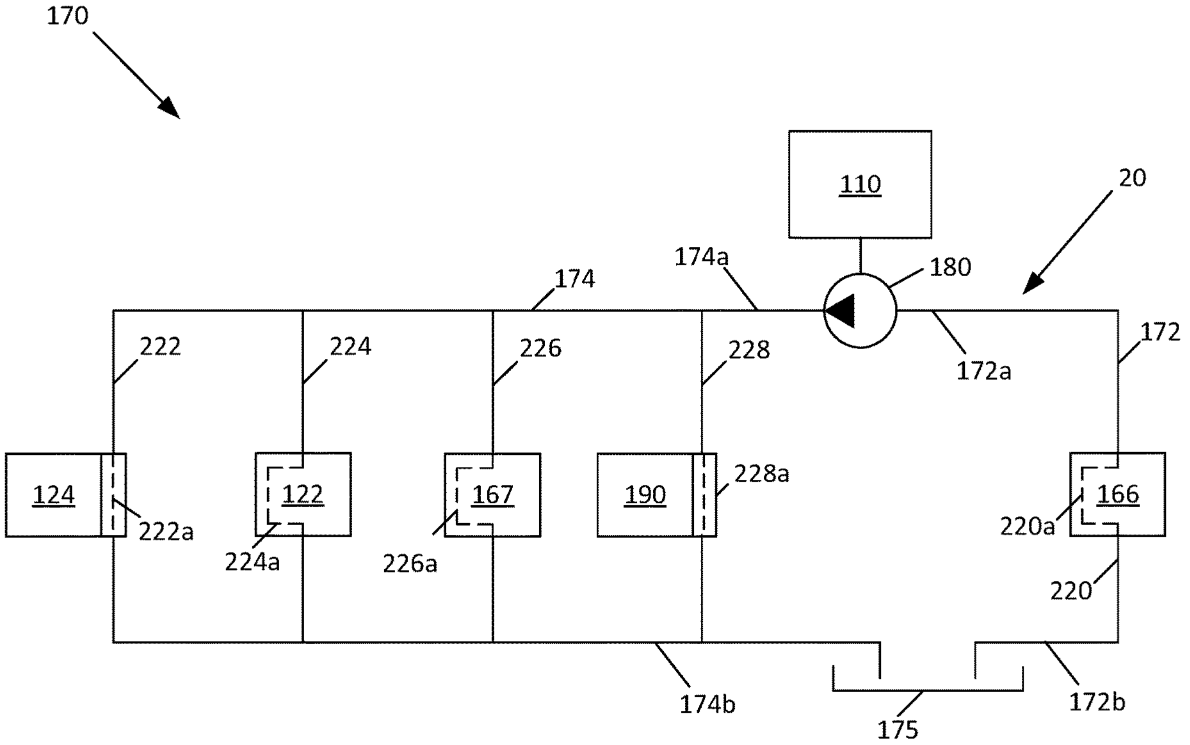
FIG. 20 is a schematic diagram of a cooling system of the electric motor assembly unit of FIG. 2.

Cooling System of FIGS. 11 and 20

Referring to FIGS. 11 and 20, a cooling system 170 is shown in which the coolant pump 180 circulates a working fluid (e.g. water, glycol, and oil, etc.) between the heat exchanger 166, where the working fluid is cooled by air flowing through the heat exchanger, to various components within the motor assembly 110, where the working fluid absorbs heat from the components. In one aspect, the heat exchanger 166 has an exchanger housing 168 and a coolant pathway 172 routed within the exchanger housing 168. In some implementations, one or more cooling plates or fins 171 form part of the heat exchanger 166 and the coolant pathway 172 delivers heated coolant to the cooling plates or fins 171. In other implementations, the coolant pathway 172 may extend through a monolithic structure (e.g., a corrugated structure) within the exchanger housing 168. In certain examples, the monolithic structure forms the exchanger housing 168. In some implementations, the heat exchanger 166 extends around a full circumference of the electric motor 110 (e.g., of the stator assembly 114). In other implementations, the heat exchanger 166 may extend over only a section of the circumference. In such implementations, a cooling jacket 167 including circumferential internal passageways 167*a* surrounding the stator assembly 114 may extend around the remainder of the circumference to form the motor housing 118. Additional details of cooling jacket configurations are further shown and described in U.S. Provisional Patent Application Ser. No. 62/931,712 filed on Nov. 6, 2019 and entitled "Axial Flux Motor with Cooling Jacket", and in PCT Application Serial Number PCT/EP2020/025497 filed on Nov. 6, 2020, the entireties of which are incorporated by reference herein.

In certain implementations, the coolant pathway 172 through the exchanger housing 168 is fluidly coupled to another coolant pathway 174 through the electric motor 110 leading to a coolant pump 180. In certain examples, the coolant pathway 174 extends through channels defined in the motor housing 118. In certain examples, the coolant pathways 174 extend through components contained within the motor housing 118. The coolant pump 180 cycles the coolant through the coolant pathways 172, 174. Because the heat exchanger 166 forms part of the motor housing 118, the coolant pathways 172, 174 are designed to fluidly couple together within the electric motor 110. In one aspect, the coolant pathway 172 functions to dissipate heat for the working fluid flowing through coolant pathway 172 while coolant pathway 174 functions to absorb heat from the internal components of the electric motor 110.

Keeping the coolant pathways 172, 174 within the electric motor assembly unit 100 removes the need for external piping and fittings between the external piping and the various components. Further, removing the external piping and locating the components within an integrated unit reduces the amount of coolant needed to span the pathways. Reducing the amount of needed piping and coolant saves cost associated with cooling the electric motor assembly unit 100. Moreover, reducing these components also reduces the weight associated with the electric motor assembly unit 100.

In one aspect, the coolant pump 180 is connected to the coolant pathways 172, 174 by supply and return branches 172*a*, 172*b*, 174*a*, 174*b*, which in turn are connected to further supply and return branches to cool various components of the motor 110. In one example, the supply and return branches 172*a*, 172*b*, 174*a*, 174*b* extend radially and/or circumferentially such that the working fluid can be distributed throughout the entire motor 110. In one example, multiple supply and return branches 172*a*, 172*b*, 174*a*, 174*b* are radially distributed at various locations in the motor 110 such that the working fluid can be distributed to various cooling circuits throughout the motor 110.

In one example, and as previously discussed, the coolant pathway 172 defines a cooling circuit 220 connected to the supply and return branches 172*a*, 172*b*, wherein the cooling circuit 220 is formed by a plurality of internal passageways 220*a* defined within the heat exchanger 166 of the motor 120. In one example, the heat exchanger 166 is configured with fins, ribs, or other surface area-maximizing features to allow air flowing by the motor 110 to cool the cooling heat exchanger 130, thereby aiding in removing heat from the working fluid within the internal passageways 220*a*. Accordingly, the heat exchanger 166 can be configured to function as an air-to-liquid heat exchanger.

In the example shown, cooling circuits 222, 224, 226, and 228 are also shown as being connected to the supply and return branches 174*a*, 174*b*. As shown, the cooling circuit 222 is shown as including internal passages 222*a* adjacent the interior side of the wire coil 124 such that heat can be transferred from the wire coil 124 to the working fluid. As shown, the cooling circuit 224 is shown as including internal passages 224*a* within and/or about each of the stator core bodies 122 such that heat can be transferred from the wire coils 124 to the stator core bodies 122 and then to the working fluid. As shown, the cooling circuit 226 is shown as including internal passages **226*a* adjacent the exterior side of the wire coil 124 such that heat can be transferred from the wire coil 124 to the working fluid. In one example, the cooling circuit 224 and internal passageways 226*a* are defined as the above-described cooling jacket 167 and internal passageways 167*a*. As shown, the cooling circuit 228*a* is shown as including internal passages 228*a* adjacent the exterior side of the epicyclic gear train 190 such that heat can be transferred from the epicyclic gear train 190 to the working fluid. As the cooling circuits 222, 224, 226, 228 are connected to the branches 174*a*, 174*b*, the warmed or heated working fluid can be circulated from the cooling circuits 222, 224, 226, 228 to the cooling circuit 220 where the fluid can be cooled and then returned back to the circuits 222, 224, 226, 228 via the pump 180. Although the cooling system 110 is shown as being provided with pathways 172, 174 and circuits 222, 224, 226, 228, other configurations including more or fewer circuits are possible without departing from the concepts disclosed herein. For example, the cooling system 170 can be provided with a plurality of branches which are routed in parallel to each other and connected to the pump 180, for example by a manifold, in order to reduce pressure drop losses of the cooling fluid. In one example, an external heat exchanger can be used in conjunction with or instead of the cooling circuit 220. In some configurations, the motor 110 can be further provided with a sump 175 connected to the return branch or branches 172*b*, 174*b*, whereby heated cooling fluid, for example sprayed fluid, can be collected and returned to the pump 180**.

Figure 21:
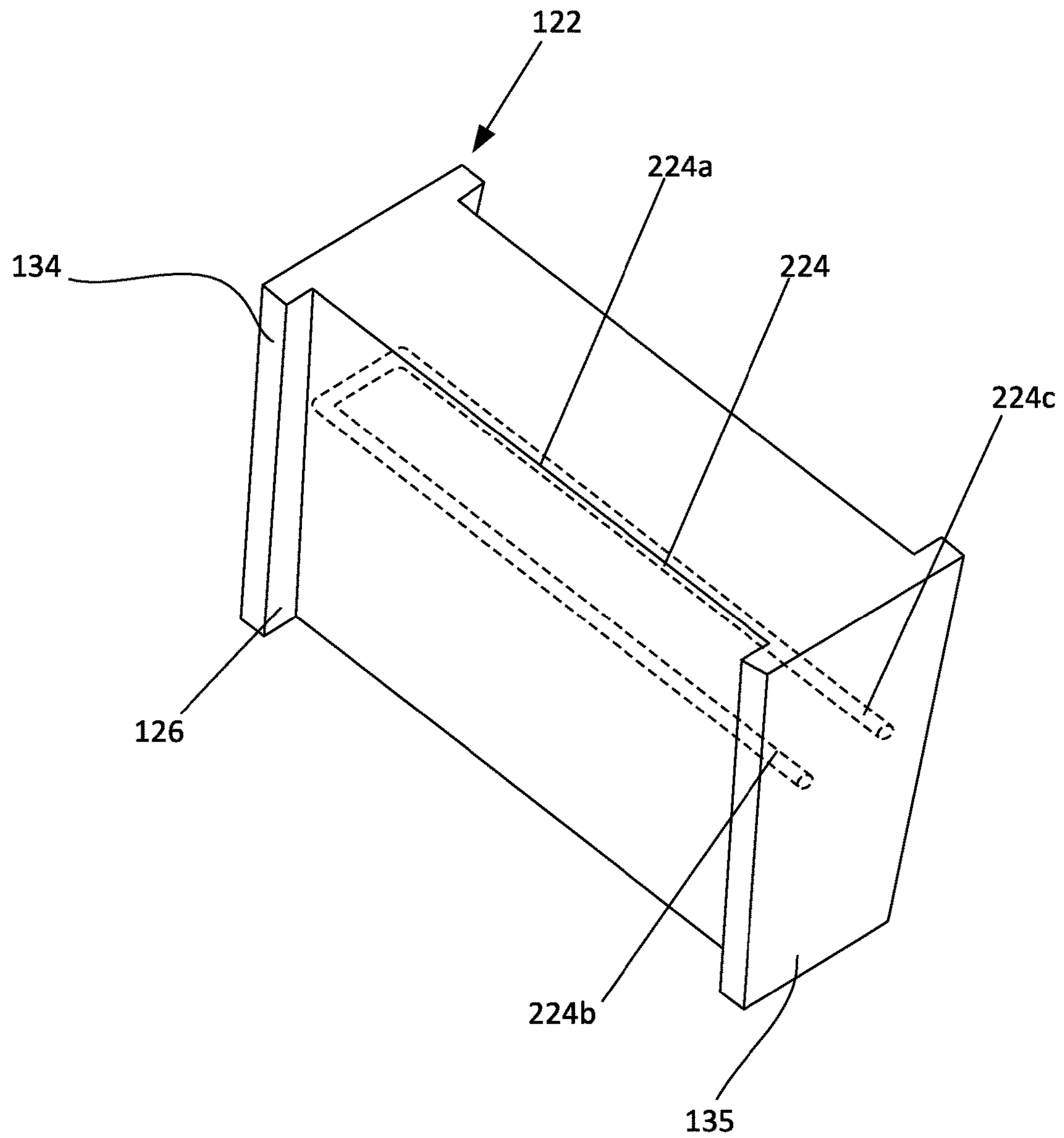
FIG. 21 is a perspective view of the stator core of the general type shown in FIG. 6 with the further inclusion of an internal passageway.

Stator Cooling Configuration of FIG. 21

Referring to FIG. 21, an individual stator core body 126 is shown in isolation to illustrate features of the stator core 122 forming part of the cooling circuit 224. As shown, an internal passageway **224*a* of the cooling circuit 224 is routed through the stator core body 126 with inlet and outlet ends 224*b*, 224*c* extending through the end face 135. The cooling circuit 224 includes further passages or branches that extend between the inlet and outlet ends 224*b*, 224*c* of each stator core 122 and the branches 174*a*, 174*b*, as schematically illustrated at FIGS. 11 and 20. Accordingly, the cooling circuit 224 includes multiple sub-circuits associated with each stator core body 126, wherein the inlets and outlets 224*b*, 224*c* are connected together such that pumped working fluid is delivered to each stator core body 126. Although FIG. 21 schematically shows the routing of the passageway 224*a* as being a single U-shaped passageway, it should be understood that passageway 224*a* can include a plurality of passageways that are provided in any number of various shapes, for example serpentine shapes. The passageway 224*a* can further include a plurality of inlet and outlet ends 224*b*, 224*c* as well. Furthermore, the passageways 224*a* can include larger cavities within the stator core body 126 such that the interior of the stator core body 126 is essentially flooded with cooling fluid. By providing one or more internal passageways 224*a* within the stator core bodies 126 of the stator assembly 114, the working fluid can remove heat very close to the heat-generating wire coils 124 for improved cooling of the motor 110. It is noted that the shape of the stator core bodies 126, and the number of stator core bodies 126 provided in the motor 110**, may vary from what is shown in the drawings without departing from the concepts presented herein.

The stator core body 126 of FIG. 21 can be manufactured by various means. For example, a solid stator core body 126, for example a solid metal stator core body, could be initially formed and then later machined to form the internal passageways **224*a*, inlet 224*b*, and outlet 224*c* with drills or other tools. The stator core body 126** can also be formed through the use of additive manufacturing techniques.

Figure 22:
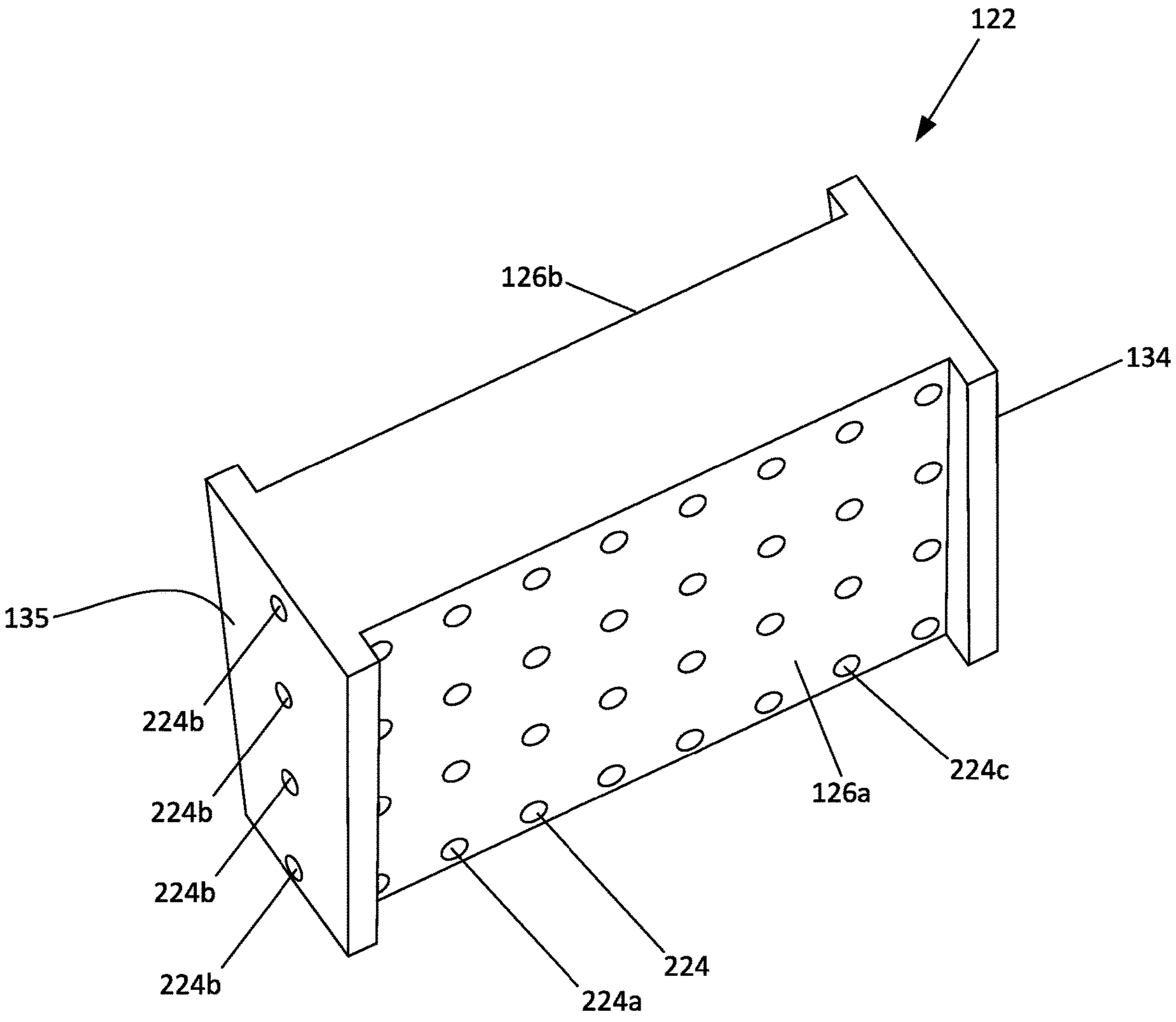
FIG. 22 is a view of the stator core of the general type shown in FIG. 6 with the further inclusion of internal passageways and spray channels.
Figure 23:
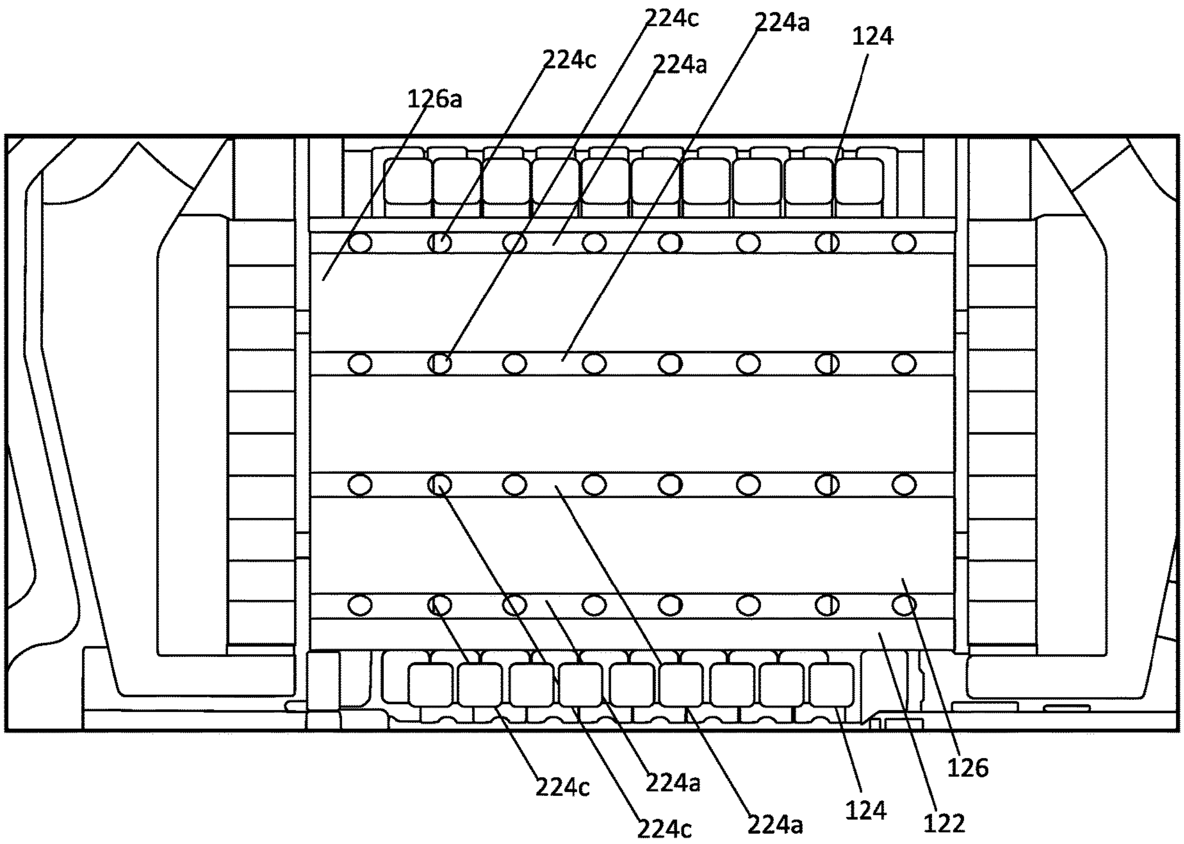
FIG. 23 is a cross-sectional view of the stator core of FIG. 22 shown in an installed condition within the axial flux motor of FIG. 1.

Stator Cooling Configuration of FIGS. 22 and 23

Referring to FIG. 22, an individual stator core 122 is shown in isolation to illustrate further features of the stator core body 126 forming part of the cooling circuit 224. FIG. 23 shows a cross-sectional view of the stator core body 126 shown in FIG. 22 in an installed environment with a wire coil 124 wrapped about the stator core body 126. As with the stator core 122 shown in FIG. 21, the stator core 122 of FIGS. 22 and 23 includes an internal passageway **224*a*. As shown, in this example, the internal passageway 224*a* includes four internal passageways extending to inlet ends 224*b* on the end face 135 of the stator core body 126. In an alternative configuration, the passageways 224*a* can be internally connected within the stator core body 126 such that only a single inlet 224*b* results. As shown, the passageways 224*a* are further provided with a plurality of outlet ports 224*c* arranged along the length of the passageways 224*a* and through opposite sides 126*a*, 126*b* of the stator core body 38. The outlet ports 224*c* may be provided on a single side 126*a*, 126*b* or on both sides 126*a*, 126*b* of the stator core body 126. The outlet ports may also be provided on the opposite sides adjacent the sides 126*a*, 126*b*. In one aspect, the outlet ports 224*c* can be characterized as nozzles. In operation, as working fluid is delivered to the internal passageways 224*a* via inlet ends 224*a*, the cooling fluid is sprayed or otherwise directed onto the wire coils 124 and the adjacent magnets as the cooling fluid exits the outlet ports 224*c*. It is noted that the shape of the stator core body 126, and the number of stator core bodies 126 provided in the motor 110, may vary from what is shown in the drawings without departing from the concepts presented herein. With the disclosed approach, as the cooling fluid comes into direct contact with the heat-generating wire 124, improved heat transfer and overall cooling of the motor 110 results. As described previously, the cooling circuit 224 includes further passages or branches that extend between the inlet and outlet ends 224*b*, 224*c* of each stator core 122 and the branches 174*a*, 174*b*, as schematically illustrated at FIGS. 11 and 20. Accordingly, the cooling circuit 224 includes multiple sub-circuits associated with each stator core body 126, wherein the inlets and outlets 224*b*, 224*c* are connected together such that pumped working fluid is delivered to each stator core body 126**.

The stator core bodies 126 of FIGS. 22 and 23 can be manufactured by various means. For example, a solid stator core body 126, for example a solid metal stator core, could be initially formed and then later machined to form the internal passageways **224*a*, inlets 224*b*, and outlets 224*c* with drills or other tools. The stator core body 126 of FIGS. 22 and 23** can also be formed through the use of additive manufacturing techniques.

Figure 24:
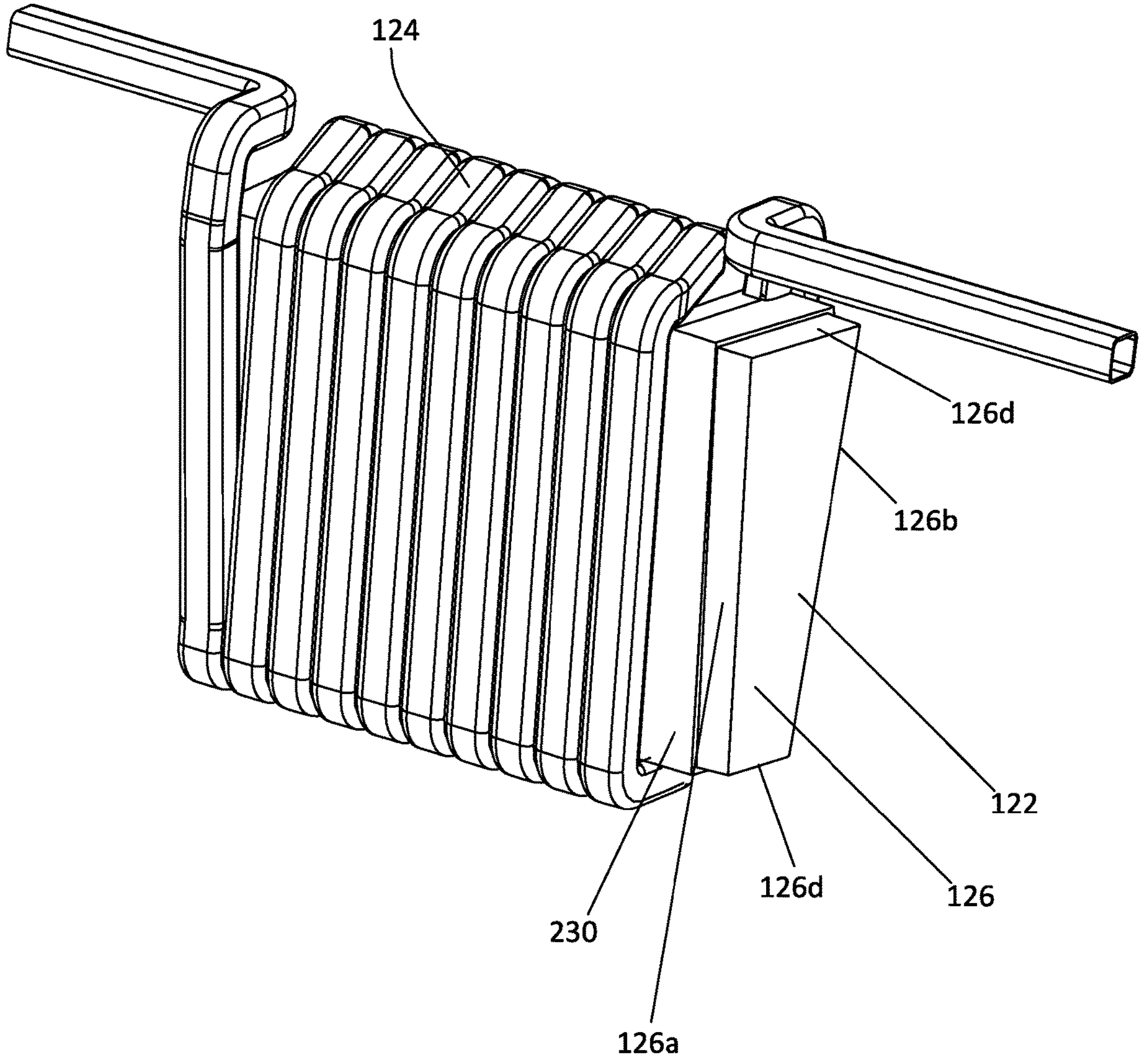
FIG. 24 is a perspective view of the stator core of the general type shown in FIG. 6 and wire coil, with an intermediate cooling layer disposed therebetween.
Figure 25:
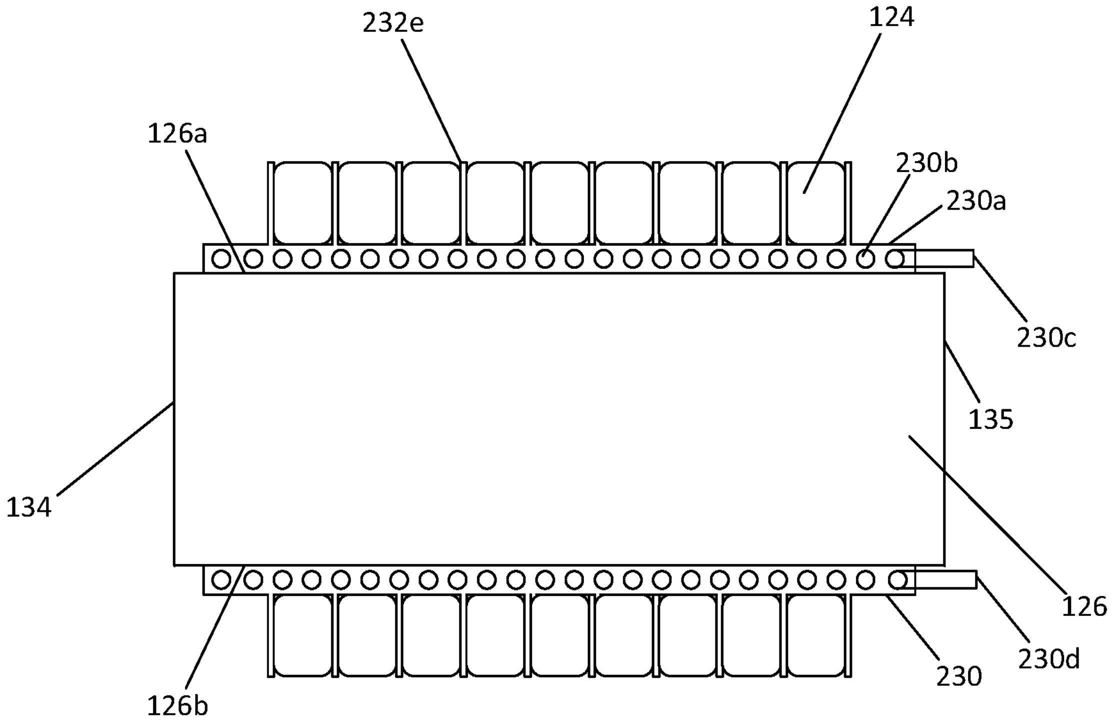
FIG. 25 is a schematic cross-sectional view of the stator core, wire coil, and intermediate cooling layer shown in FIG. 24.

Stator Cooling Configuration of FIGS. 24 and 25

Referring to FIGS. 24 and 25, an individual stator core body 126 and wound wire coil 124 are shown in isolation to illustrate further features of the stator assembly 114 that can form part of the cooling circuit 224. The stator core body 126 of FIGS. 24 and 25 can be configured as generally shown at FIG. 6. As presented, an intermediate cooling layer 230 is wrapped about the sides **126*a*, 126*b*, 126*c*, 126*d* of the stator core body 126 such that the intermediate cooling later 230 resides between and is adjacent to the wire coil 124 and the stator core body 126. Accordingly, the intermediate cooling layer 230 is in very close proximity to both the stator core body 126 and the winding 124 for maximized heat transfer. The intermediate cooling layer 230 may also be referred to as a cooling wrap arrangement. The intermediate cooling layer 230 accommodates the shape of the stator core/tooth 126 and can be manufactured from one or from multiple pieces. In one aspect, and as can be seen schematically at FIG. 25, the intermediate cooling layer 230 has a main body 230***a* with internally embedded passageways (e.g. micro-channels) 230*b* which are fed by one or more inlets and outlets 230*c*, 230*d*. Accordingly, the working fluid from the cooling system 170 can be directed through the internal passageways 230*b* to allow heat to be transferred from the winding 124 to the working fluid. The main body 230*a* can also be provided with separators 232*e* that are part of the main body 230*a* and that can extend between each individual coil to increase the surface area that is in direct contact with the coil 124. Additional geometry modifications can be added to the intermediate cooling layer 230 to facilitate an optimal design. This intermediate cooling layer 230 can also serve the purpose of an insulating material. Ideally this material would have high thermal conductivity for optimal thermal performance and have high dielectric strength for high voltage capability, for example a thermally conductive, silicone based material. The intermediate cooling layer 230, including the internal cooling passages 230*b*, main body 230*a*, inlet and outlets 230*c*, 230*d*, and separators 230*e* can be made with via an additive manufacturing process, but other manufacturing methods are not excluded. It is noted that the shape of the stator core body 126, and the number of stator cores 122 provided in the motor 110, may vary from what is shown in the drawings without departing from the concepts presented herein. As described previously, the cooling circuit 224 includes further passages or branches that extend between the inlet and outlet ends 224*b*, 224*c* of each stator core intermediate cooling layer 230 and the branches 174*a*, 174*b*, as schematically illustrated at FIGS. 11 and 20. Accordingly, the cooling circuit 224 includes multiple sub-circuits associated with each stator core body 126, wherein the inlets and outlets 224*b*, 224*c* are connected together such that pumped working fluid is delivered to each stator core intermediate cooling layer 230.

Figure 26:
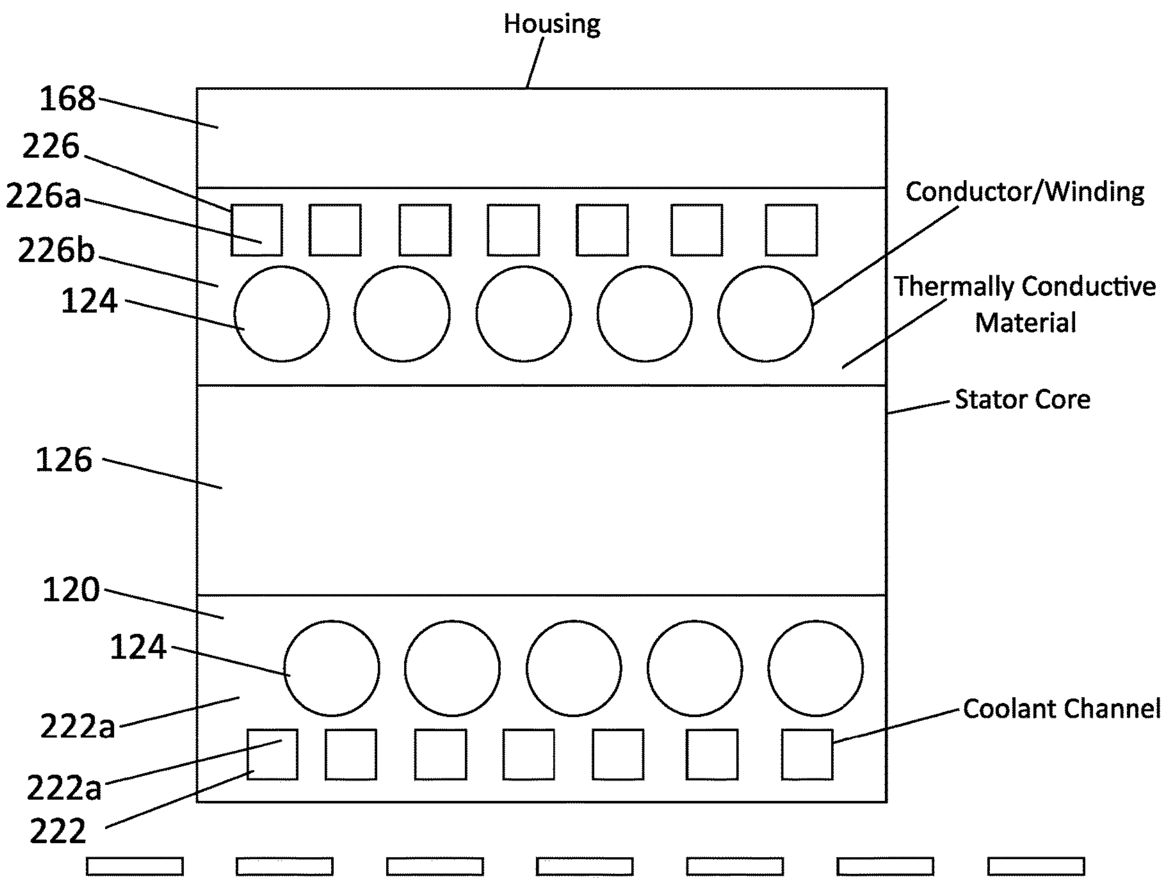
FIG. 26 is a schematic cross-sectional view of the stator assembly of the general type shown in FIGS. 4 and 11, with cooling channels shown adjacent the radial interior side and the radial exterior side of the wire coil.

Stator Cooling Configuration of FIG. 26

Referring to FIG. 18, a schematic cross-sectional view is presented showing a stator assembly 114 with stator cores 122 and windings 124 with additional features that can form part of the cooling circuits 222, 226. In one aspect, the cooling circuit 222 is formed as a circumferential annulus or ring located proximate the radial interior sides of the windings 124 of the stator cores 122 while the cooling circuit 226 is also formed as a circumferential annulus or ring located proximate the radial exterior sides of the windings 124 of the stator cores 122. In the particular example shown, the cooling circuits 222, 226 are formed by a thermally conductive material, such as epoxy, for maximum heat transfer from the windings 124 to the cooling fluid in the passageways 222*a*, 226*a* of the cooling circuits 222, 226. In one example process, epoxy is applied directly onto the windings 124 to form a body 222*b*, 226*b* within which the windings 124 are embedded and within which the internal passageways 222*a*, 226*a* are also formed. With such a configuration, not only is heat transfer maximized, but structural rigidity is added to the motor 110 with the epoxy while minimizing additional weight due to the cooling system 170. A housing, for example housing 168, may be provided to provide structural rigidity and inlet/outlet ports as well as other features, but the housing 168 in this case does not have to contain the cooling passages 226*a*. Also, the cooling passages 222*a*, 226*a* shown in FIG. 26 may be designed to flow in any direction. It is also noted that a motor 110 and associated cooling system 170 can be configured to include only the cooling circuit 222, only the cooling circuit 226, or both cooling circuits 222, 226. For example, the cooling circuit 222 depicted at FIG. 26 may be used with a construction involving a circuit 226 including the cooling jacket 167 and passageways 167*a* shown at FIGS. 4 and 20.

There are multiple possible ways of manufacturing the cooling passages 222*a*, 226*a* within the respective body 222*b*, 226*b*. For example, one way would be to utilize a soluble material that is embedded into the thermally conductive material 222*b*, 226*b* and then dissolving the soluble material to create cavities 222*a*, 226*a*. Another alternative would be to embed highly thermally conductive tubes into the thermally conductive material and then utilize those tubes as cooling passages 222*a*, 226*a*. Other ways to manufacture such a machine/stator are not excluded.

Figure 27:
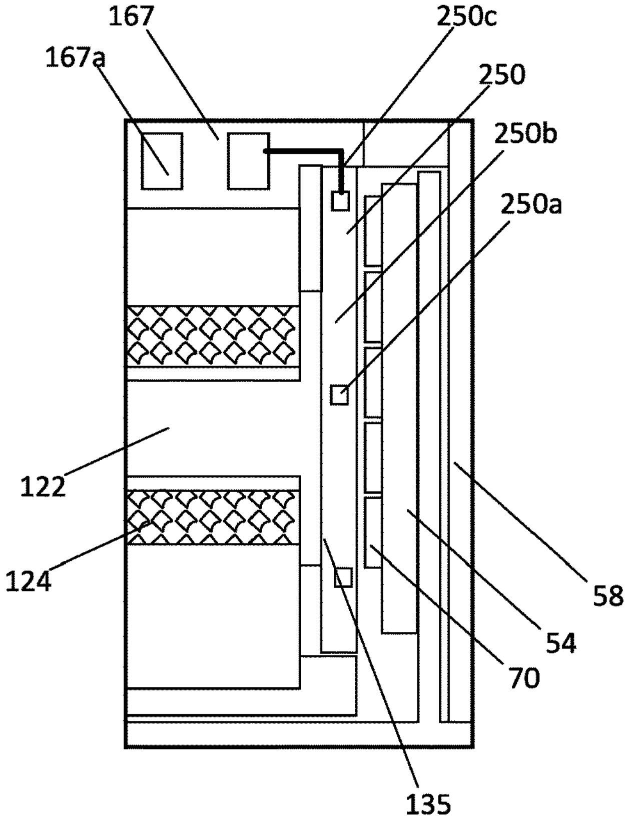
FIG. 27 is a schematic partial cross-section of the motor assembly of FIG. 2 in which an end plate with internal cooling passageways is provided.
Figure 28:
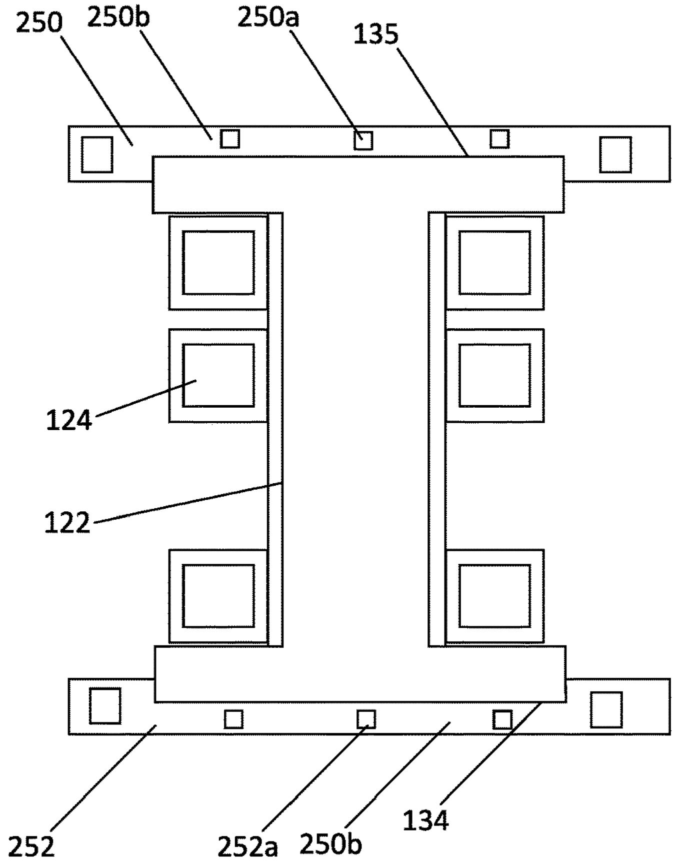
FIG. 28 is a schematic partial cross-section of the assembly shown in FIG. 27 further illustrating cooling passageways.

Stator Cooling Configuration of FIGS. 27 and 28

Referring to FIGS. 27 and 28, a schematic cross-sectional view is presented showing an a stator assembly 114 with stator cores 122 and windings 124 with additional features that can form an additional cooling circuit 170 that works in conjunction with the cooling jacket 167 disclosed in the configuration shown at FIGS. 4 and 20. As discussed previously, the cooling circuit 226 and respective passageways 226*a* can be provided in the form of a cooling jacket 167 and internal passageways 167*a*. The configuration shown at FIGS. 27 and 28 builds upon this concept by providing cooling end plates 250, 252, adjacent to and in contact with the end faces 134, 135 of the stator core bodies 126, which respectively incorporate internal cooling channels 250*a*, 252*a* disposed within an annular main body 250*b*, 252*b*. As illustrated at FIG. 27, the cooling plate 20 can include an interconnecting passageways, for example passageway 250*c*, to place the internal passageways 167*a* of the cooling jacket 167 in fluid communication with the internal cooling channels 250*a*, 252*a*. As the cooling plates 250, 252 are in direct contact with the stator core bodies 126, heat transfer is maximized beyond what is achievable with the cooling jacket 167 alone. It is noted that the internal channels 250*a*, 250*b* may be interconnected to the internal passageways 167*a* at multiple locations 250*c* such that the length of any given channel or passageway is minimized, thereby reducing the associated pressure drop the pump 180 must overcome. The passageways 250*a*, 252*a* can be routed in a variety of ways, for example the passageways 250*a*, 252*a* can be provided with a serpentine shape or a spiral shape. Although two cooling end plates 250, 252 are shown, the cooling system 170 can include a single cooling end plate 250, 252 as well. In some examples, the cooling end plates are formed from a polymeric or plastic material, for example, a thermoplastic material such as a polyether ether ketone (PEEK).

Examples

Various examples of this disclosure may also be embodied in the aspects discussed below.

Aspect 1: A motor assembly including a motor shaft, a rotor assembly, a stator assembly including at least one stator core about which a wire coil is wound and embedded within a thermally conductive material, the stator assembly defining an annulus with a radial interior side and a radial exterior side, and a first internal fluid passageway defined within the thermally conductive material and being located at one of the radial interior side and the radial exterior side of the stator assembly, the first internal fluid passageway being configured for receiving a cooling fluid.

Aspect 2: The motor assembly of aspect 1, wherein the first internal fluid passageway includes a plurality of internal fluid passageways.

Aspect 3: The motor assembly of aspect 1, wherein the first internal fluid passageway is located at the radial interior side of the stator assembly.

Aspect 4: The motor assembly of aspect 1, wherein the first internal fluid passageway is located at the radial exterior side of the stator assembly.

Aspect 5: The motor assembly of aspect 1, further including a second internal fluid passageway defined within the thermally conductive material and being located at the other of the radial interior side or the radial exterior side of the stator assembly, the second internal fluid passageway being configured for receiving the cooling fluid.

Aspect 6: The motor assembly of aspect 5, wherein the first and second internal fluid passageways each include a plurality of internal fluid passageways.

Aspect 7: The motor assembly of aspect 1, wherein the first internal fluid passageway is located at the radial interior side of the stator assembly and the second internal fluid passageway is located at the radial exterior side of the stator assembly.

Aspect 8: The motor assembly of aspect 5, wherein the first internal fluid passageway and the second internal fluid passageway each include at least one fluid inlet and at least one fluid outlet.

Aspect 9: The motor assembly of aspect 1, wherein the motor assembly further includes a pump for delivering cooling fluid to the first internal fluid passageway.

Aspect 10: The motor assembly of aspect 1, wherein the thermally conductive material is an epoxy material.

Aspect 11: A stator assembly for a motor, the stator assembly including at least one stator core about which a wire coil is wound and embedded within a thermally conductive material, the stator assembly defining an annulus with a radial interior side and a radial exterior side, and a first internal fluid passageway defined within the thermally conductive material and being located at one of the radial interior side and the radial exterior side of the stator assembly, the first internal fluid passageway being configured for receiving a cooling fluid.

Aspect 12: The stator assembly of aspect 11, wherein the first internal fluid passageway includes a plurality of internal fluid passageways.

Aspect 13: The stator assembly of aspect 11, wherein the first internal fluid passageway is located at the radial interior side of the stator assembly.

Aspect 14: The stator assembly of aspect 11, wherein the first internal fluid passageway is located at the radial exterior side of the stator assembly.

Aspect 15: The stator assembly of aspect 11, further including a second internal fluid passageway defined within the thermally conductive material and being located at the other of the radial interior side or the radial exterior side of the stator assembly, the second internal fluid passageway being configured for receiving the cooling fluid.

Aspect 16: The stator assembly of aspect 15, wherein the first and second internal fluid passageways each include a plurality of internal fluid passageways.

Aspect 17: The stator assembly of aspect 15, wherein the first internal fluid passageway is located at the radial interior side of the stator assembly and the second internal fluid passageway is located at the radial exterior side of the stator assembly.

Aspect 18: The stator assembly of aspect 15, wherein the first internal fluid passageway and the second internal fluid passageway each include at least one fluid inlet and at least one fluid outlet.

Aspect 19: The stator assembly of aspect 11, wherein the thermally conductive material is an epoxy material.

Aspect 20: A method of cooling a stator assembly of a motor, the method including delivering a cooling fluid to at least one stator core about which a wire coil is wound, and directing the cooling fluid through one or more internal passageways of a thermally conductive material within which the wire coil is embedded.

Aspect 21: The method of aspect 20, wherein the delivering step is performed with a pump.

Aspect 22: The method of aspect 21, wherein the delivering step is performed with a pump driven by the motor.

Although this disclosure, covers certain motor types and certain geometries, the general cooling ideas area also applicable to other motor topologies and geometries.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

What is claimed is:

1. A motor assembly comprising:

a motor shaft defining an axis of rotation;

a rotor assembly with two magnetic rotors separated by an axial dimension of the motor assembly that extends along the axis of rotation;

a stator assembly positioned axially between the two magnetic rotors, the stator assembly including a plurality of stator cores positioned around the axis of rotation, the stator assembly also including wire windings wound about each of the stator cores, the coil windings being embedded in a thermally conductive material, the stator assembly defining an annulus with an annular interior side that surrounds the axis of rotation and an annular exterior side that surrounds the axis of rotation;

a first cooling circuit for cooling the annular interior side of the stator assembly and a second cooling circuit for cooling the annular exterior side of the stator assembly;

the first cooling circuit including a plurality of first cooling passages that surround the axis of rotation at the annular interior side of the stator assembly, the first cooling passages being spaced apart from one another in the axial dimension of the motor assembly, and the first cooling passages being defined through the thermally conductive material;

the second cooling circuit including a plurality of second cooling passages that surround the axis of rotation at the annular exterior side of the stator assembly, the second cooling passages being spaced apart from one another in the axial dimension of the motor assembly; and a motor housing surrounding the annular exterior side of the stator assembly, the motor housing including a heat exchanger, wherein the first and second cooling circuits are both in fluid communication with the heat exchanger;

wherein an inlet line to the first and second coolant circuits is adjacent to a first magnetic rotor of the two magnetic rotors and an outlet line of the first and second coolant circuits is adjacent to a second magnetic rotor of the two magnetic rotors.

2. The motor assembly of claim 1, wherein the second cooling passages are defined through the thermally conductive material.

3. The motor assembly of claim 1, wherein the second cooling passages are defined through the motor housing.

4. The motor assembly of claim 1, wherein a third cooling circuit including a third plurality of fluid passageways is defined through the stator cores.

* * * * *